US011596200B2

(12) United States Patent
Walker et al.

(10) Patent No.: US 11,596,200 B2
(45) Date of Patent: Mar. 7, 2023

(54) ELECTRORHEOLOGICAL FLUID STRUCTURE HAVING STRAIN RELIEF ELEMENT AND METHOD OF FABRICATION

(71) Applicant: NIKE, Inc., Beaverton, OR (US)

(72) Inventors: Steven H. Walker, Camas, WA (US); Chin-yuan Cheng, Kirkland, WA (US)

(73) Assignee: NIKE, Inc., Beaverton, OR (US)

( * ) Notice: Subject to any disclaimer, the term of this patent is extended or adjusted under 35 U.S.C. 154(b) by 237 days.

(21) Appl. No.: 16/903,576

(22) Filed: Jun. 17, 2020

(65) Prior Publication Data

US 2020/0305550 A1    Oct. 1, 2020

Related U.S. Application Data

(62) Division of application No. 15/363,426, filed on Nov. 29, 2016, now Pat. No. 10,813,407.

(Continued)

(51) Int. Cl.
*B32B 38/14*      (2006.01)
*B32B 37/12*      (2006.01)
(Continued)

(52) U.S. Cl.
CPC .............. *A43B 13/189* (2013.01); *A43B 3/34* (2022.01); *A43B 5/06* (2013.01); *A43B 7/24* (2013.01);
(Continued)

(58) Field of Classification Search
CPC ........... A43B 13/189; A43B 3/34; A43B 5/06; A43B 7/24; A43B 13/04; A43B 13/12;
(Continued)

(56) References Cited

U.S. PATENT DOCUMENTS 3,906,185 A    9/1975 Gross et al.
4,183,156 A    1/1980 Rudy
(Continued)

FOREIGN PATENT DOCUMENTS

DE        10240530 A1    3/2004
EP         2774502 A1    9/2014
(Continued)

OTHER PUBLICATIONS

Feb. 17, 2017—(WO) ISR & WO—App. No. PCT/US16/064068.
(Continued)

*Primary Examiner* — Michael N Orlando
*Assistant Examiner* — Christopher W Raimund
(74) *Attorney, Agent, or Firm* — Banner & Witcoff, Ltd.

(57) ABSTRACT

An article may include a first polymeric material layer having a surface. A first conductive trace may form at least a portion of the first layer surface. The article may further include a second polymeric material layer. The second layer may have a first surface, a portion of the second layer first surface being bonded to a portion of the first layer surface. The second layer may have a portion of a channel defined therein, the channel at least partially coinciding with a portion of the first conductive trace. The article may also include a first patch interposed between the first layer (Continued)

surface and the second layer first surface. The first patch may span the channel and cover a portion of the first conductive trace.

20 Claims, 15 Drawing Sheets

Related U.S. Application Data

(60) Provisional application No. 62/260,883, filed on Nov. 30, 2015.

(51) Int. Cl.

| | | |
|---|---|---|
| *B32B 37/16* | (2006.01) | |
| *B32B 37/00* | (2006.01) | |
| *B29C 65/04* | (2006.01) | |
| *B29D 35/00* | (2010.01) | |
| *B32B 37/24* | (2006.01) | |
| *B29C 35/00* | (2006.01) | |
| *B32B 37/18* | (2006.01) | |
| *A43B 13/18* | (2006.01) | |
| *A43B 13/14* | (2006.01) | |
| *A43B 7/24* | (2006.01) | |
| *A43B 5/06* | (2022.01) | |
| *A43B 3/34* | (2022.01) | |
| *A43B 13/04* | (2006.01) | |
| *A43B 13/12* | (2006.01) | |

(52) U.S. Cl.
CPC .............. *A43B 13/04* (2013.01); *A43B 13/12* (2013.01); *A43B 13/14* (2013.01); *A43B 13/188* (2013.01); *B29C 65/04* (2013.01); *B29D 35/00* (2013.01); *B32B 37/0076* (2013.01); *B32B 37/12* (2013.01); *B32B 37/16* (2013.01); *B32B 38/14* (2013.01); *B29C 35/00* (2013.01); *B32B 37/182* (2013.01); *B32B 2037/243* (2013.01); *B32B 2310/0868* (2013.01); *B32B 2375/00* (2013.01)

(58) Field of Classification Search
CPC ....... A43B 13/14; A43B 13/188; A43B 13/18; B29C 65/04; B29C 35/00; B29D 35/00; B32B 37/0076; B32B 37/12; B32B 37/16; B32B 38/14; B32B 37/182; B32B 2037/243; B32B 2310/0868; B32B 2375/00
See application file for complete search history.

(56) References Cited

U.S. PATENT DOCUMENTS

| | | | |
|---|---|---|---|
| 4,219,945 | A | 9/1980 | Rudy |
| 4,471,538 | A | 9/1984 | Pomeranz et al. |
| 4,898,084 | A | 2/1990 | Oppermann et al. |
| 4,923,057 | A | 5/1990 | Carlson et al. |
| 4,952,868 | A | 8/1990 | Scherer, III |
| 4,999,931 | A | 3/1991 | Vermeulen |
| 5,335,382 | A | 8/1994 | Huang |
| 5,493,792 | A | 2/1996 | Bates et al. |
| 5,686,167 | A | 11/1997 | Rudy |
| 5,794,366 | A | 8/1998 | Chien |
| 5,813,142 | A | 9/1998 | Demon |
| 5,979,086 | A | 11/1999 | Vindriis |
| 6,138,382 | A | 10/2000 | Schoesler |
| 6,349,487 | B1 | 2/2002 | Hice |
| 6,378,558 | B1 | 4/2002 | Pohl et al. |
| 6,433,465 | B1 | 8/2002 | McKnight et al. |
| 6,812,624 | B1 | 11/2004 | Pei et al. |
| 6,845,573 | B2 | 1/2005 | Litchfield et al. |
| 6,971,193 | B1 | 12/2005 | Potter et al. |
| 7,007,412 | B2 | 3/2006 | Munster |
| 7,200,956 | B1 | 4/2007 | Kotha et al. |
| 7,204,041 | B1 | 4/2007 | Bailey, Sr. et al. |
| 7,219,449 | B1 | 5/2007 | Hoffberg et al. |
| 7,254,908 | B2 | 8/2007 | Ungari |
| 7,409,779 | B2 | 8/2008 | Dojan et al. |
| 7,950,169 | B2 | 5/2011 | Holt et al. |
| 8,234,800 | B2 | 8/2012 | Buder et al. |
| 8,302,327 | B2 | 11/2012 | Battlogg |
| 8,973,613 | B2 | 3/2015 | Murphy et al. |
| 9,107,475 | B2 | 8/2015 | Ellis |
| 9,271,538 | B2 | 3/2016 | Ellis |
| 9,820,531 | B2 | 11/2017 | Walker et al. |
| 2002/0133237 | A1 | 9/2002 | Christesen |
| 2003/0056401 | A1 | 3/2003 | Kwon |
| 2003/0120353 | A1 | 6/2003 | Christensen |
| 2003/0154628 | A1 | 8/2003 | Gyr |
| 2004/0002665 | A1 | 1/2004 | Parihar et al. |
| 2004/0154190 | A1 | 8/2004 | Munster |
| 2004/0177531 | A1 | 9/2004 | DiBenedetto et al. |
| 2004/0211085 | A1 | 10/2004 | Passke et al. |
| 2005/0172515 | A1 | 8/2005 | Ungari |
| 2005/0183292 | A1 | 8/2005 | DiBenedetto et al. |
| 2005/0268487 | A1 | 12/2005 | Ellis |
| 2006/0143645 | A1 | 6/2006 | Vock et al. |
| 2006/0241783 | A1 | 10/2006 | Christensen |
| 2006/0248749 | A1 | 11/2006 | Ellis |
| 2006/0248750 | A1 | 11/2006 | Rosenberg |
| 2007/0000154 | A1 | 1/2007 | DiBenedetto et al. |
| 2007/0006489 | A1 | 1/2007 | Case et al. |
| 2008/0245985 | A1 | 10/2008 | Heim et al. |
| 2009/0200501 | A1 | 8/2009 | Heim et al. |
| 2009/0235557 | A1 | 9/2009 | Christensen et al. |
| 2009/0248760 | A1 | 10/2009 | Tone et al. |
| 2010/0211355 | A1 | 8/2010 | Horst et al. |
| 2010/0251574 | A1 | 10/2010 | Battlogg et al. |
| 2011/0251536 | A1* | 10/2011 | Wilford .................. A61H 9/00 601/151 |
| 2012/0233878 | A1 | 9/2012 | Hazenberg et al. |
| 2012/0273053 | A1 | 11/2012 | Murphy et al. |
| 2012/0291564 | A1 | 11/2012 | Amos et al. |
| 2013/0019694 | A1 | 1/2013 | Molyneux et al. |
| 2013/0033042 | A1 | 2/2013 | Fortier et al. |
| 2013/0160329 | A1 | 6/2013 | Peyton et al. |
| 2013/0185003 | A1 | 7/2013 | Carbeck et al. |
| 2013/0213147 | A1 | 8/2013 | Rice et al. |
| 2013/0278436 | A1 | 10/2013 | Ellis |
| 2013/0291407 | A1 | 11/2013 | Adair et al. |
| 2014/0033572 | A1 | 2/2014 | Steier et al. |
| 2014/0053427 | A1 | 2/2014 | Patton |
| 2014/0059781 | A1 | 3/2014 | Lafleche et al. |
| 2014/0068973 | A1 | 3/2014 | Krupenkin et al. |
| 2014/0250726 | A1 | 9/2014 | Meschter |
| 2014/0277632 | A1 | 9/2014 | Walker |
| 2015/0157091 | A1 | 6/2015 | Hsu |
| 2015/0177081 | A1 | 6/2015 | Steier |
| 2016/0345663 | A1 | 12/2016 | Walker et al. |
| 2016/0345669 | A1 | 12/2016 | Orand et al. |
| 2016/0345670 | A1 | 12/2016 | Orand |
| 2016/0367192 | A1 | 12/2016 | Iyengar et al. |
| 2017/0071287 | A1 | 3/2017 | Kim |
| 2017/0150780 | A1 | 6/2017 | Walker et al. |

FOREIGN PATENT DOCUMENTS

| | | |
|---|---|---|
| KR | 20130048669 A | 5/2013 |
| WO | 9835529 A2 | 8/1998 |
| WO | 0178539 A2 | 10/2001 |
| WO | 2007125148 A1 | 11/2007 |
| WO | 2008156860 A1 | 12/2008 |
| WO | 2012112931 A2 | 8/2012 |
| WO | 2014138020 A1 | 9/2014 |

OTHER PUBLICATIONS

Demon, Ronald, "Black History in America" Internet Archive Wayback Machine, http://www.myblackhistor.net/Ronald_Demon. htm, pp. 1-2.

(56) References Cited

OTHER PUBLICATIONS

Sep. 19, 2016—(WO) ISR & WO—App. No. PCT/US16/033899.
Vieroth, et al., Stretchable Circuit Board Technology and Application, Wearable Computers, 2009 ISWC '09, International Symposium. Sep. 7, 2009 (Sep. 7, 2009), pp. 33-36, XP055351553, Piscataway, NJ, USA, DOI: 10.1109/ISWC.2009.13, ISBN: 978-0-7695-3779-5, sentences 3-5, 20-21, paragraph 2.2.
Mar. 15, 2017—(WO) ISR & WO—App. No. PCT/US16/064084.

* cited by examiner

FIG. 5C1

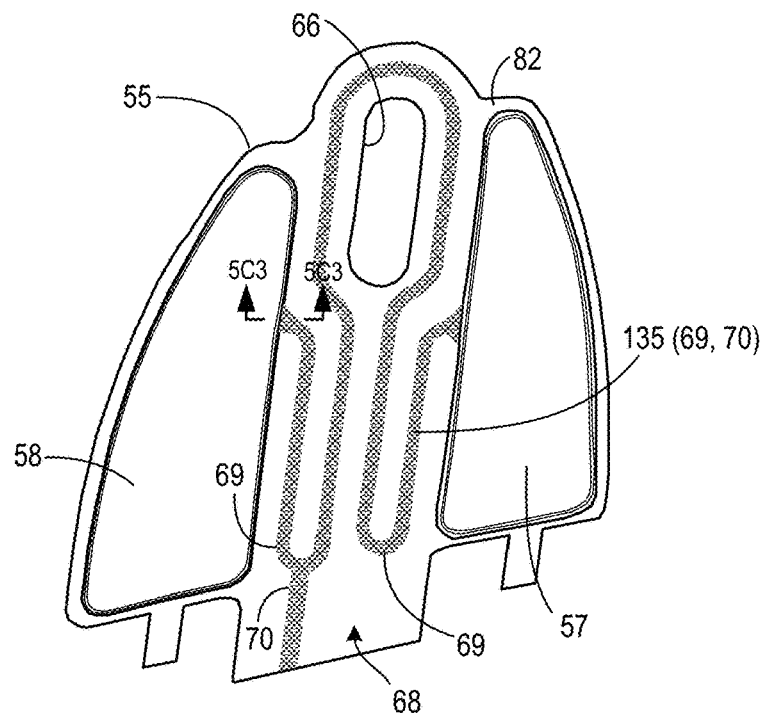
FIG. 5C2
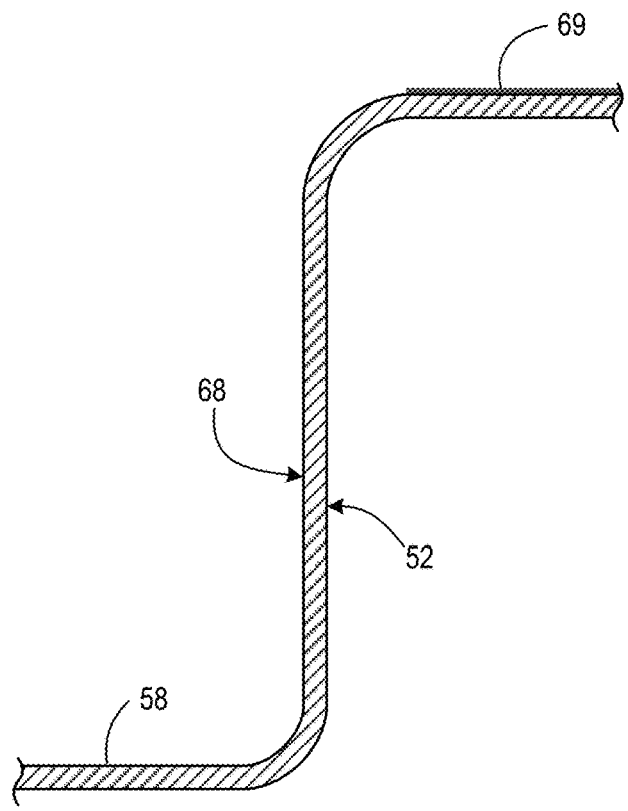
FIG. 5C3

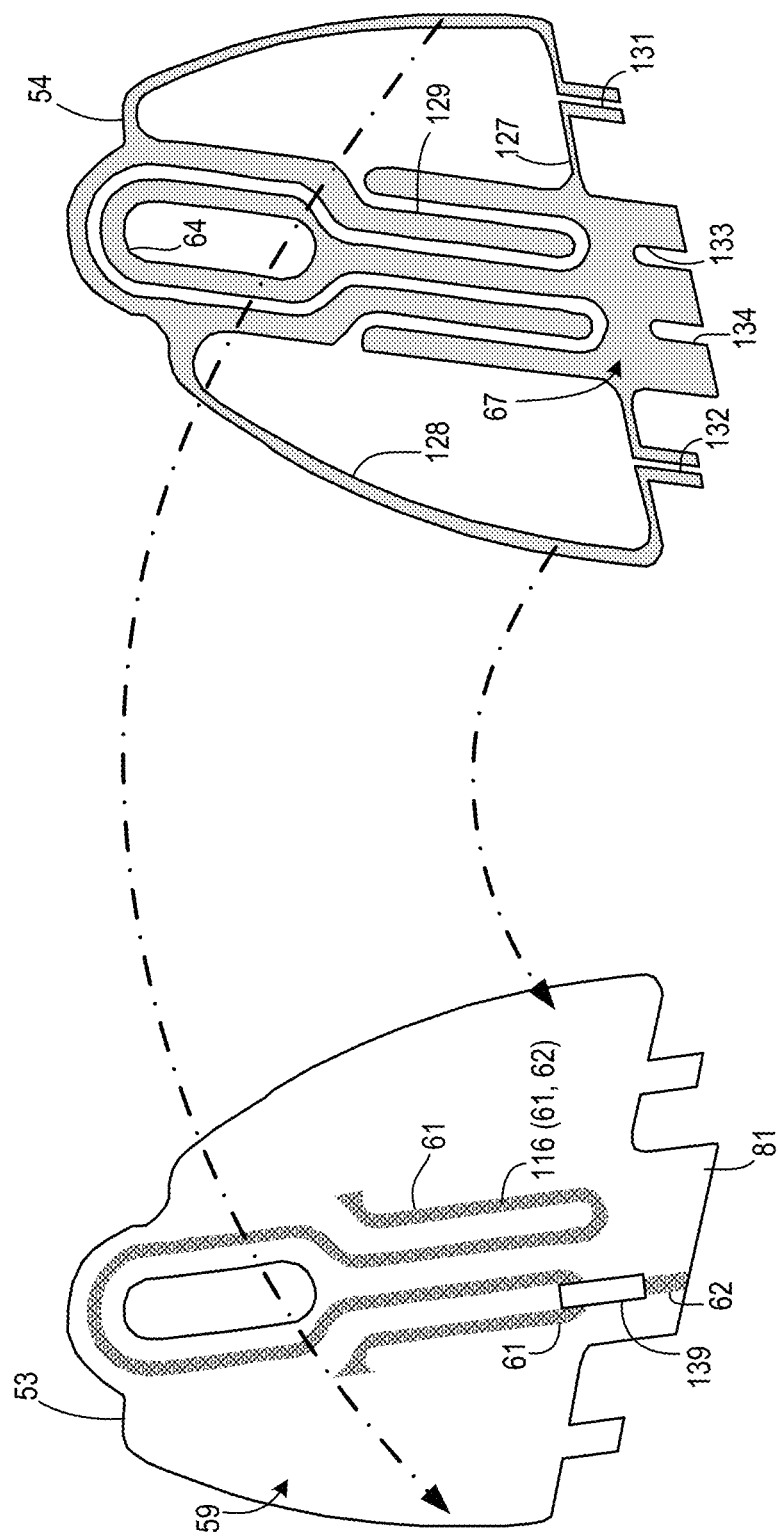
FIG. 5D1

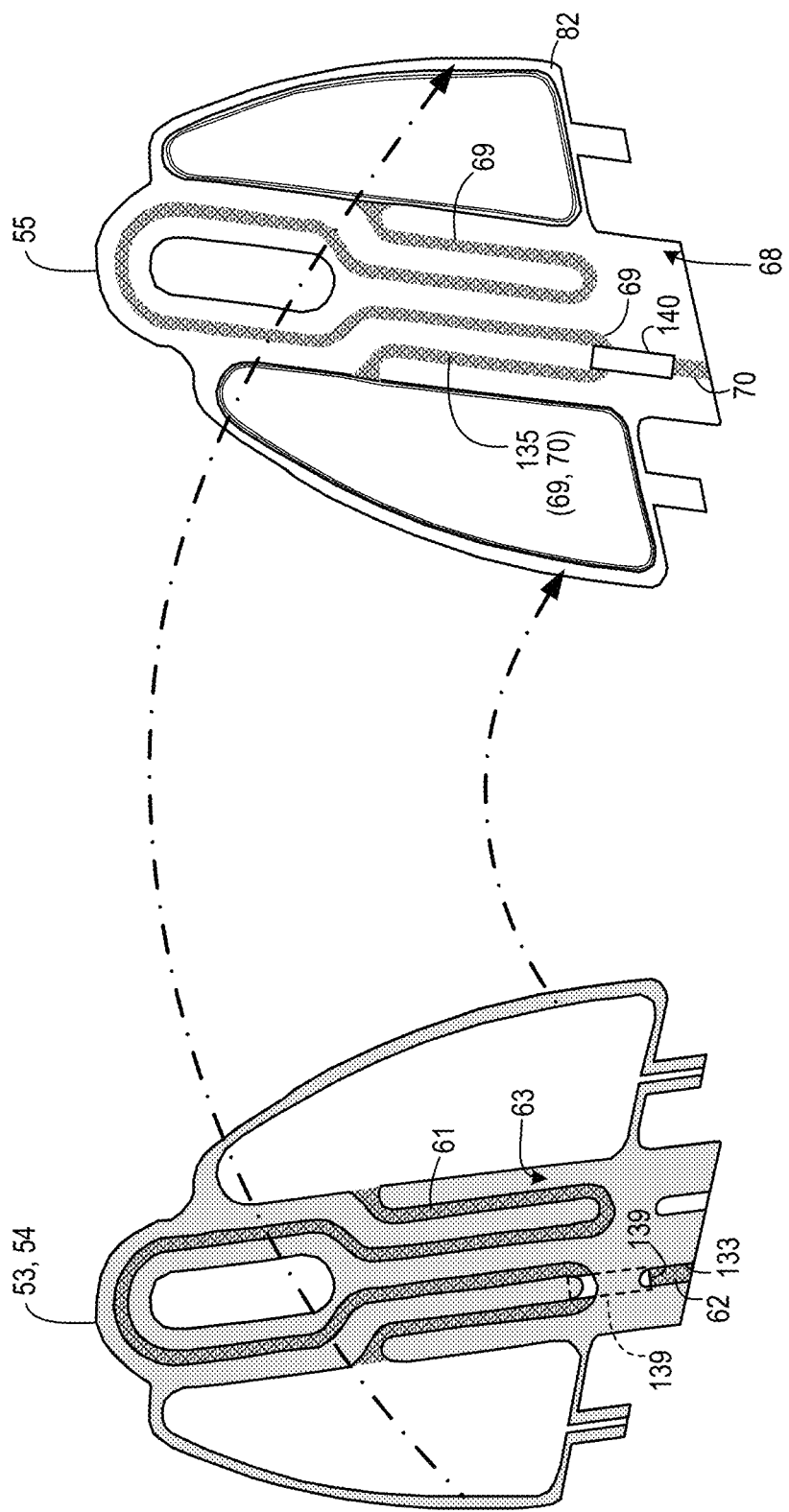
FIG. 5D2

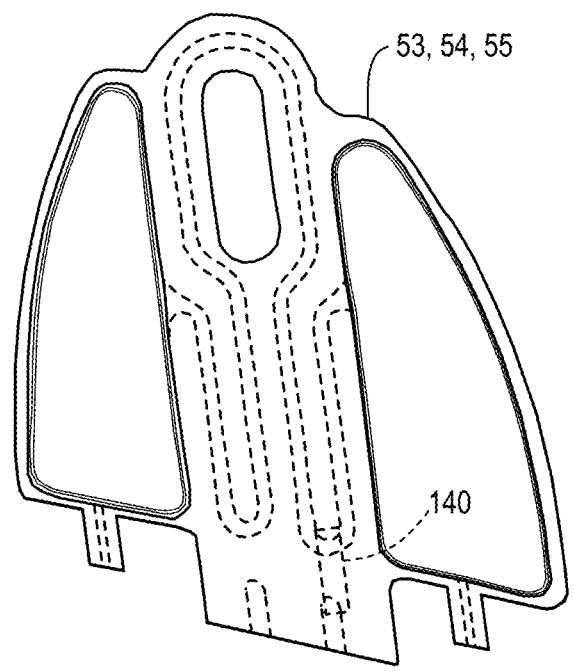
FIG. 5D3

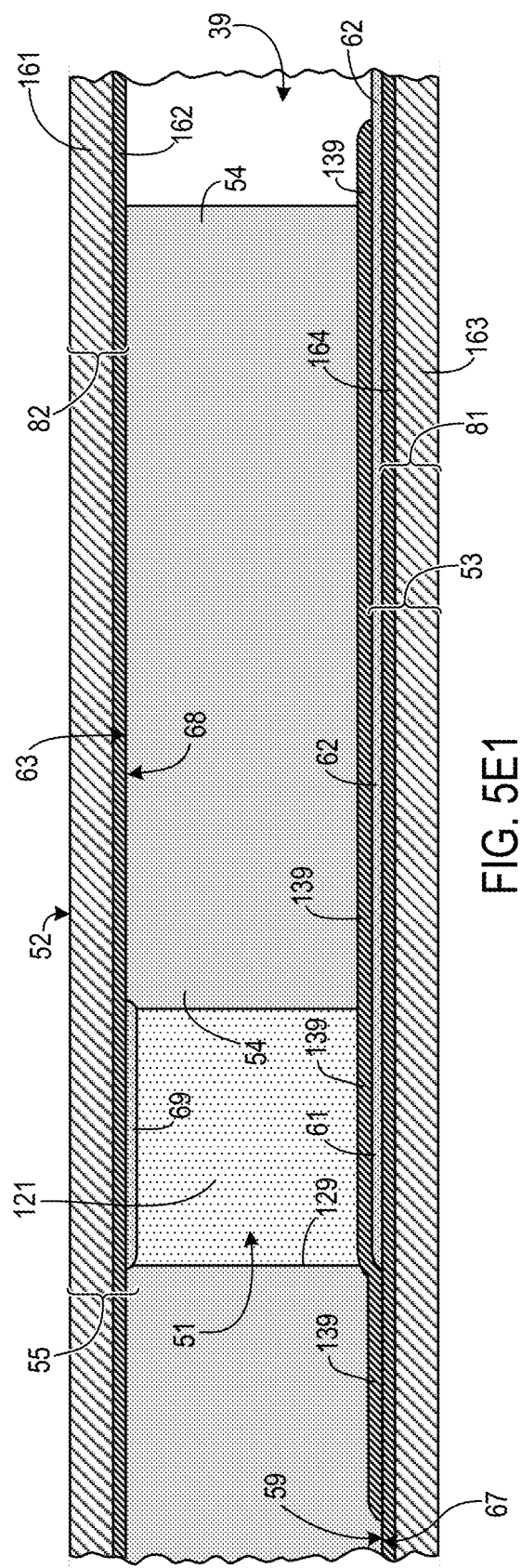
FIG. 5E1
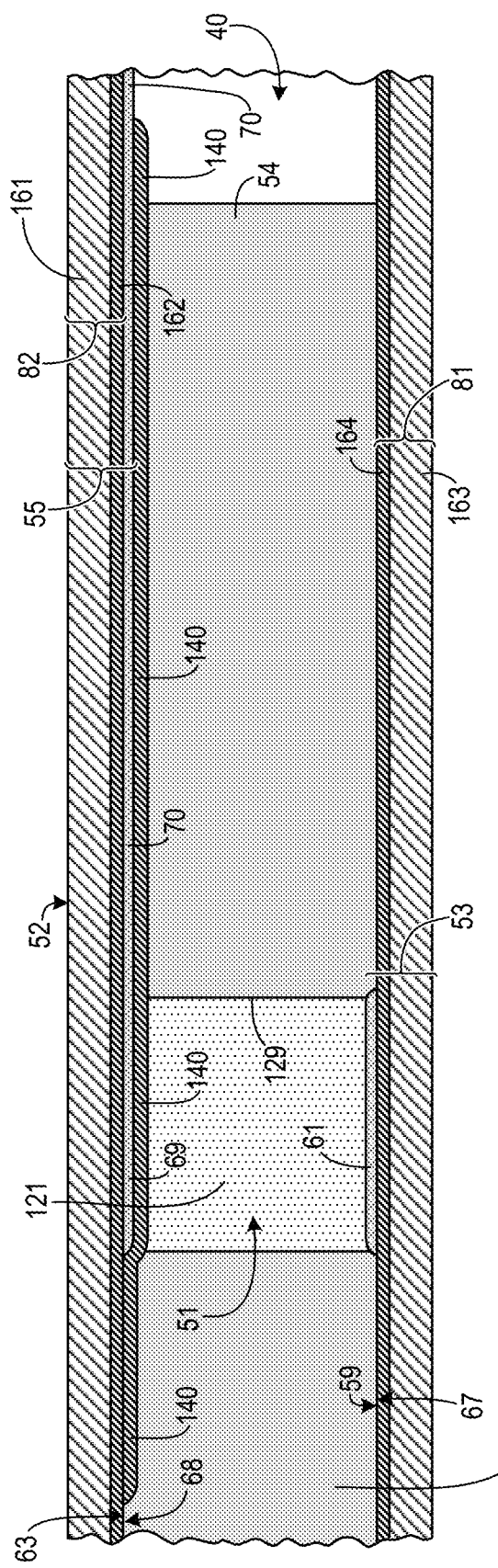
FIG. 5E2

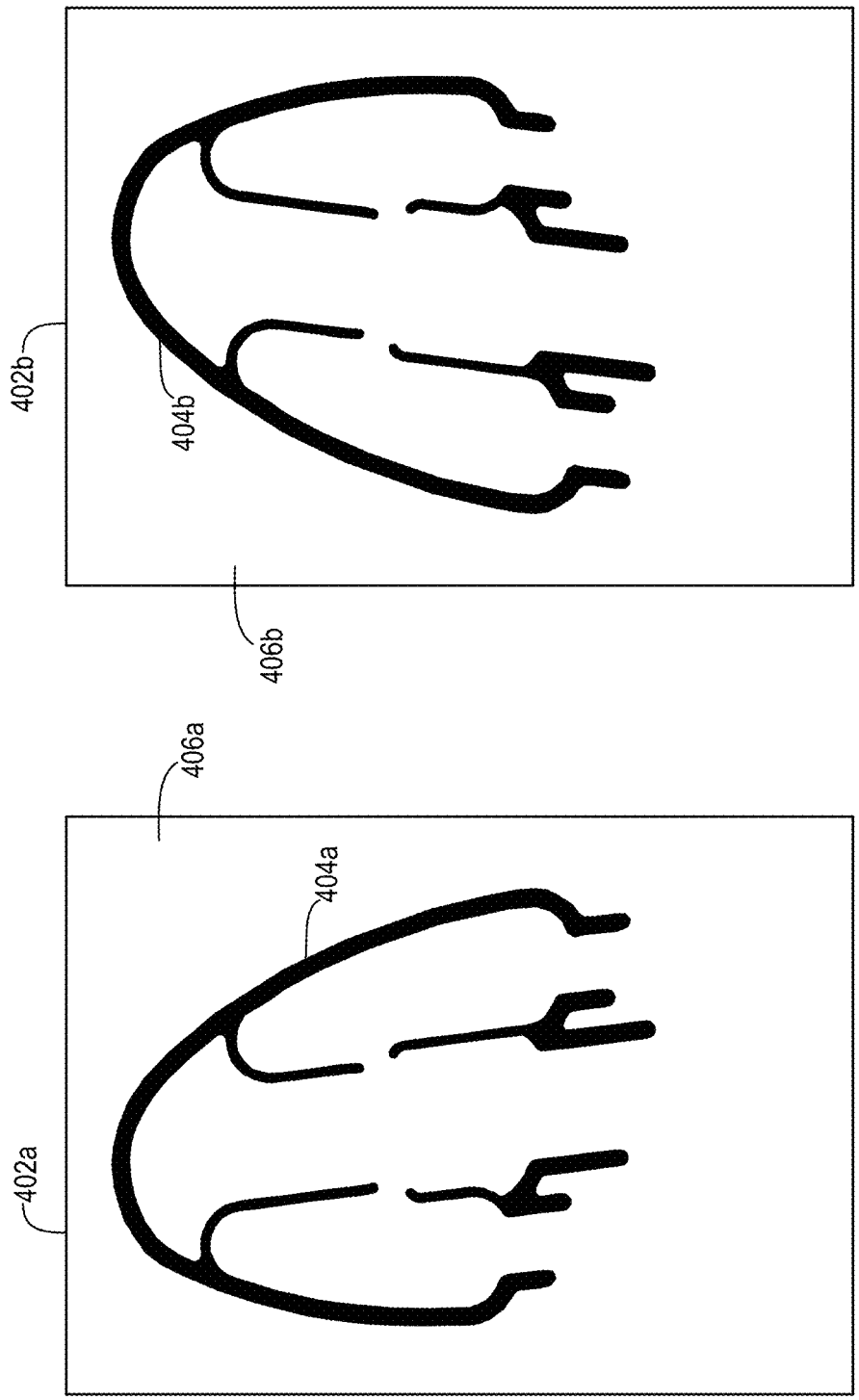

ELECTRORHEOLOGICAL FLUID STRUCTURE HAVING STRAIN RELIEF ELEMENT AND METHOD OF FABRICATION

CROSS REFERENCE TO RELATED APPLICATIONS

This application is a divisional of U.S. patent application Ser. No. 15/363,426, titled "ELECTRORHEOLOGICAL FLUID STRUCTURE HAVING STRAIN RELIEF ELEMENT AND METHOD OF FABRICATION" and filed Nov. 29, 2016, which application claims priority to U.S. provisional patent application No. 62/260,883, titled "ELECTRORHEOLOGICAL FLUID STRUCTURE HAVING STRAIN RELIEF ELEMENT AND METHOD OF FABRICATION" and filed Nov. 30, 2015. Applications No. 62/260,883 and Ser. No. 15/363,426, in their entireties, are incorporated by reference herein.

BACKGROUND

Conventional articles of footwear generally include an upper and a sole structure. The upper provides a covering for the foot and securely positions the foot relative to the sole structure. The sole structure is secured to a lower portion of the upper and is configured so as to be positioned between the foot and the ground when a wearer is standing, walking, or running.

Conventional footwear is often designed with the goal of optimizing a shoe for a particular condition or set of conditions. For example, sports such as tennis and basketball require substantial side-to-side movements. Shoes designed for wear while playing such sports often include substantial reinforcement and/or support in regions that experience more force during sideways movements. As another example, running shoes are often designed for forward movement by a wearer in a straight line. Difficulties can arise when a shoe must be worn during changing conditions, or during multiple different types of movements.

SUMMARY

This Summary is provided to introduce a selection of concepts in a simplified form that are further described below in the Detailed Description. This Summary is not intended to identify key features or essential features of the invention.

In at least some embodiments, an article includes a first polymeric material layer having a surface. A first conductive trace may form at least a portion of the first layer surface. The article may further include a second polymeric material layer. The second layer may have a first surface, a portion of the second layer first surface being bonded to a portion of the first layer surface. The second layer may have a portion of a channel defined therein, the channel at least partially coinciding with a portion of the first conductive trace. The article may also include a first patch interposed between the first layer surface and the second layer first surface. The first patch may span the channel and cover a portion of the first conductive trace.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIG. 5C1 is a top view of a top layer of the incline adjuster of FIG. 4A.

FIG. 5C2 is a bottom view of the top layer of the incline adjuster of FIG. 4A.

FIG. 5C3 is a partial area cross-sectional view of the top layer of the incline adjuster of FIG. 4A.

FIG. 5D1 shows a first assembly operation in the fabrication of an incline adjuster according to some embodiments.

FIG. 5D2 shows a second assembly operation in the fabrication of an incline adjuster according to some embodiments.

FIG. 5D3 is a top view of a partially completed incline adjuster after bonding of layers but prior to filling with electrorheological fluid.

FIGS. 5E1 and FIG. 5E2 are area cross-sectional views taken from the locations indicated in FIG. 4A.

FIGS. 8C and 8D are top views of two sides of a second RF welding tool according to some embodiments.

DETAILED DESCRIPTION

Figure 1:
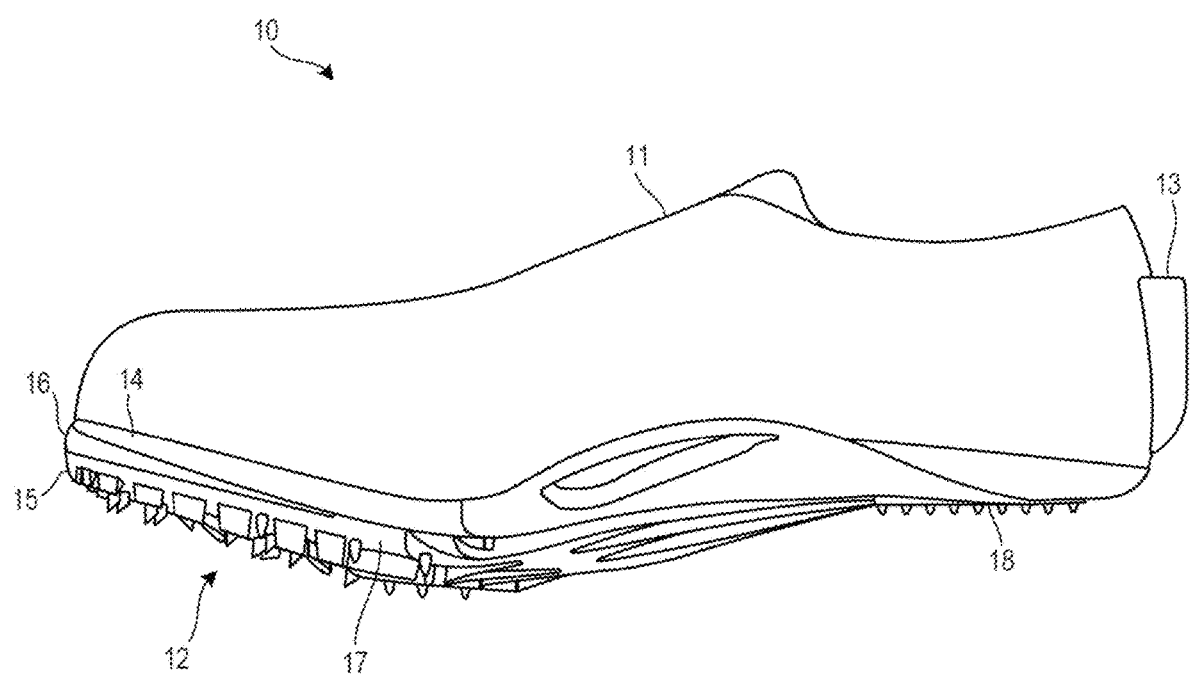
FIG. 1 is a medial side view of a shoe according to some embodiments.

In various types of activities, it may be advantageous to change the shape of a shoe or shoe portion while a wearer of that shoe is running or otherwise participating in the activity. In many running competitions, for example, athletes race around a track having curved portions, also known as "bends." In some cases, particularly shorter events such as 200 meter or 400 meter races, athletes may be running at sprint paces on a track bend. Running on a flat curve at a fast pace is biomechanically inefficient, however, and may require awkward body movements. To counteract such effects, bends of some running tracks are banked. This banking allows more efficient body movement and typically results in faster running times. Tests have shown that similar advantages can be achieved by altering the shape of a shoe.

In particular, running on a flat track bend in a shoe having a footbed that is inclined relative to the ground can mimic the benefits of running on a banked bend in a shoe having a non-inclined footbed. However, an inclined footbed is a disadvantage on straight portions of a running track. Footwear that can provide an inclined footbed when running on a bend and reduce or eliminate the incline when running on a straight track section would offer a significant advantage.

In footwear according to some embodiments, electrorheological (ER) fluid is used to change the shape of one or more shoe portions. ER fluids typically comprise a non-conducting oil or other fluid in which very small particles are suspended. In some types of ER fluid, the particles may be have diameters of 5 microns or less and may be formed from polystyrene or another polymer having a dipolar molecule. When an electric field is imposed across the ER fluid, the viscosity of the fluid increases as the strength of that field increases. As described in more detail below, this effect can be used to control transfer of fluid and modify the shape of a footwear component. Although track shoe embodiments are initially described, other embodiments include footwear intended for other sports or activities.

To assist and clarify subsequent description of various embodiments, various terms are defined herein. Unless context indicates otherwise, the following definitions apply throughout this specification (including the claims). "Shoe" and "article of footwear" are used interchangeably to refer to an article intended for wear on a human foot. A shoe may or may not enclose the entire foot of a wearer. For example, a shoe could include a sandal-like upper that exposes large portions of a wearing foot. The "interior" of a shoe refers to space that is occupied by a wearer's foot when the shoe is worn. An interior side, surface, face, or other aspect of a shoe component refers to a side, surface, face or other aspect of that component that is (or will be) oriented toward the shoe interior in a completed shoe. An exterior side, surface, face or other aspect of a component refers to a side, surface, face or other aspect of that component that is (or will be) oriented away from the shoe interior in the completed shoe. In some cases, the interior side, surface, face or other aspect of a component may have other elements between that interior side, surface, face or other aspect and the interior in the completed shoe. Similarly, an exterior side, surface, face or other aspect of a component may have other elements between that exterior side, surface, face or other aspect and the space external to the completed shoe.

Shoe elements can be described based on regions and/or anatomical structures of a human foot wearing that shoe, and by assuming that the interior of the shoe generally conforms to and is otherwise properly sized for the wearing foot. A forefoot region of a foot includes the heads and bodies of the metatarsals, as well as the phalanges. A forefoot element of a shoe is an element having one or more portions located under, over, to the lateral and/or medial side of, and/or in front of a wearer's forefoot (or portion thereof) when the shoe is worn. A midfoot region of a foot includes the cuboid, navicular, and cuneiforms, as well as the bases of the metatarsals. A midfoot element of a shoe is an element having one or more portions located under, over, and/or to the lateral and/or medial side of a wearer's midfoot (or portion thereof) when the shoe is worn. A heel region of a foot includes the talus and the calcaneus. A heel element of a shoe is an element having one or more portions located under, to the lateral and/or medial side of, and/or behind a wearer's heel (or portion thereof) when the shoe is worn. The forefoot region may overlap with the midfoot region, as may the midfoot and heel regions.

Unless indicated otherwise, a longitudinal axis refers to a horizontal heel-toe axis along the center of the foot that is roughly parallel to a line along the second metatarsal and second phalanges. A transverse axis refers to a horizontal axis across the foot that is generally perpendicular to a longitudinal axis. A longitudinal direction is generally parallel to a longitudinal axis. A transverse direction is generally parallel to a transverse axis.

FIG. 1 is a medial side view of a track shoe 10 according to some embodiments. The lateral side of shoe 10 has a similar configuration and appearance, but is configured to correspond to a lateral side of a wearer foot. Shoe 10 is configured for wear on a right foot and is part of a pair that includes a shoe (not shown) that is a mirror image of shoe 10 and is configured for wear on a left foot.

Shoe 10 includes an upper 11 attached to a sole structure 12. Upper 11 may be formed from any of various types or materials and have any of a variety of different constructions. In some embodiments, for example, upper 11 may be knitted as a single unit and may not include a bootie of other type of liner. In some embodiments, upper 11 may be slip lasted by stitching bottom edges of upper 11 to enclose a foot-receiving interior space. In other embodiments, upper 11 may be lasted with a strobel or in some other manner. A battery assembly 13 is located in a rear heel region of upper 11 and includes a battery that provides electrical power to a controller. The controller is not visible in in FIG. 1, but is described below in connection with other drawing figures.

Sole structure 12 includes a footbed 14, an outsole 15, and an incline adjuster 16. Incline adjuster 16 is situated between outsole 15 and footbed 14 in a forefoot region. As explained in more detail below, incline adjuster 16 includes a medial side fluid chamber that supports a medial forefoot portion of footbed 14, as well as a lateral side fluid chamber that supports a lateral forefoot portion of footbed 14. ER fluid may be transferred between those chambers through a connecting transfer channel that is in fluid communication with the interiors of both chambers. That fluid transfer may raise the height of one chamber relative to the other chamber, resulting in an incline in a portion of footbed 14 located over the chambers. When further flow of ER fluid through the channel is interrupted, the incline is maintained until ER fluid flow is allowed to resume.

Figure 2A:
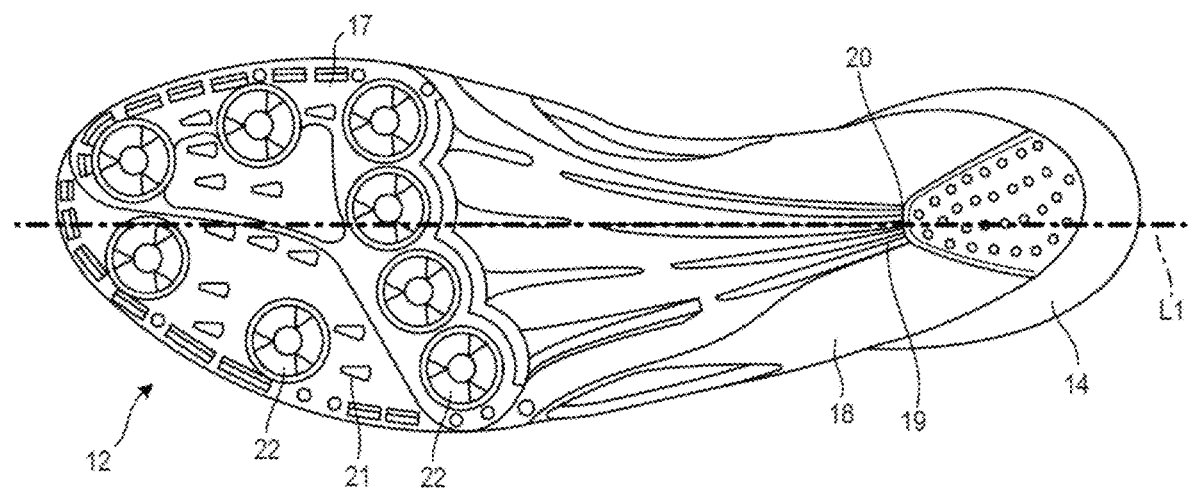
FIG. 2A is a bottom view of the sole structure of the shoe of FIG. 1.
Figure 2B:
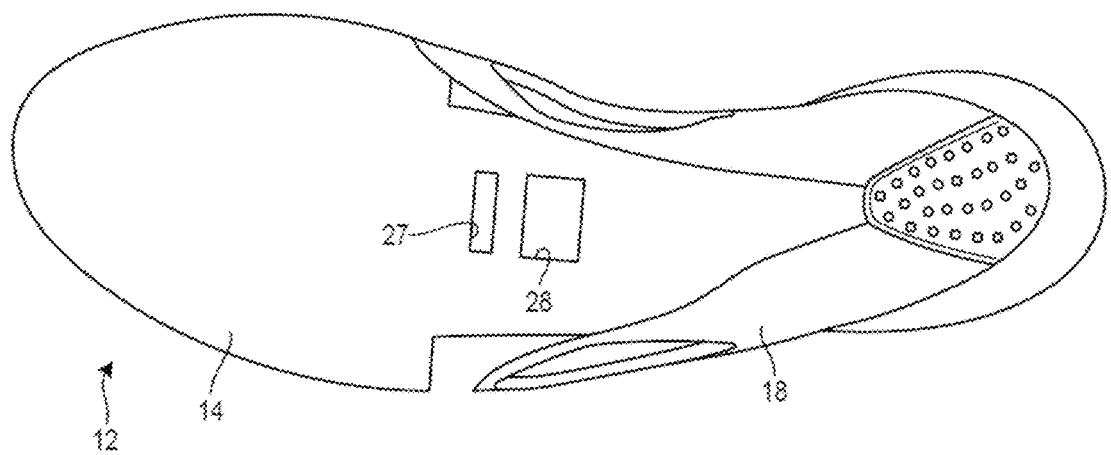
FIG. 2B is a bottom view of the sole structure of the shoe of FIG. 1, but with a forefoot outsole element and an incline adjuster removed.
Figure 2C:
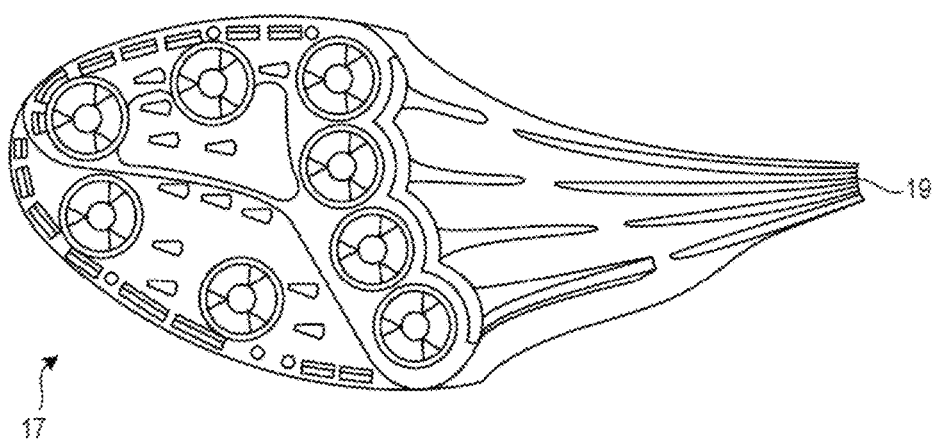
FIG. 2C is a bottom view of the forefoot outsole element of the sole structure of the shoe of FIG. 1.

Outsole 15 forms the ground-contacting portion of sole structure 12. In the embodiment of shoe 10, outsole 15 includes a forward outsole section 17 and a rear outsole section 18. The relationship of forward outsole section 17 and rear outsole section 18 can be seen by comparing FIG. 2A, a bottom view of sole structure 12, and FIG. 2B, a bottom view of sole structure 12 with forefoot outsole section 17 and incline adjuster 16 removed. FIG. 2C is a bottom view of forefoot outsole section 17 removed from sole structure 12. As seen in FIG. 2A, forward outsole section 17 extends through forefoot and central midfoot regions of sole structure 12 and tapers to a narrowed end 19. End 19 is attached to rear outsole section 18 at a joint 20 located in the heel region. Rear outsole section 18 extends over side midfoot regions and over the heel region and is attached to footbed 14. Forward outsole section 17 is also coupled to footbed 14 by a fulcrum element and by the above-mentioned fluid chambers of incline adjuster 16. Forefoot outsole section 17 pivots about a longitudinal axis L1 passing through joint 20 and through the forefoot fulcrum element. In particular, and as explained below, forefoot outsole section 17 rotates about axis L1 as a forefoot portion of footbed 14 inclines relative to forefoot outsole section 17.

Outsole 15 may be formed of a polymer or polymer composite and may include rubber and/or other abrasion-resistant material on ground-contacting surfaces. Traction elements 21 may be molded into or otherwise formed in the bottom of outsole 15. Forefoot outsole section 17 may also include receptacles to hold one or more removable spike elements 22. In other embodiments, outsole 15 may have a different configuration.

Footbed 14 includes a midsole 25. In the embodiment of shoe 10, midsole 25 has a size and a shape approximately corresponding to a human foot outline, is a single piece that extends the full length and width of footbed 14, and includes a contoured top surface 26 (shown in FIG. 3). The contour of top surface 26 is configured to generally correspond to the shape of the plantar region of a human foot and to provide arch support. Midsole 25 may be formed from ethylene vinyl acetate (EVA) and/or one or more other closed cell polymer foam materials. Midsole 25 may also have pockets 27 and 28 formed therein to house a controller and other electronic components, as described below. Upwardly extending medial and lateral sides of rear outsole section 18 may also provide additional medial and lateral side support to a wearer foot. In other embodiments, a footbed may have a different configuration, e.g., a midsole may cover less than all of a footbed or may be entirely absent, and/or a footbed may include other components.

Figure 3:
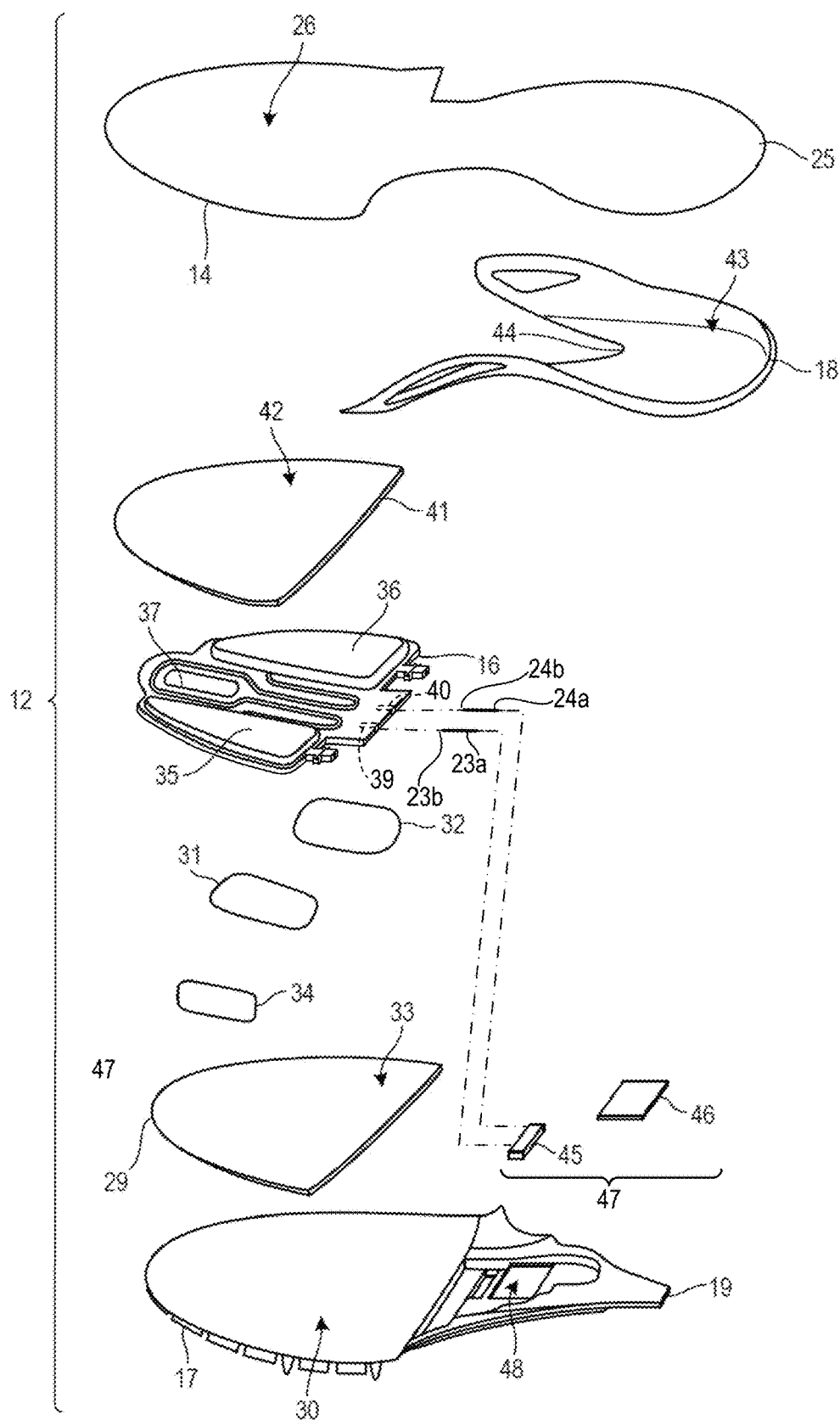
FIG. 3 is a partially exploded medial perspective view of the sole structure of the shoe of FIG. 1.

FIG. 3 is a partially exploded medial perspective view of sole structure 12. Bottom support plate 29 is located in a plantar region of shoe 10. In the embodiment of shoe 10, bottom support plate 29 is attached to a top surface 30 of forward outsole section 17. Bottom support plate 29, which may be formed from a relatively stiff polymer or polymer composite, helps to stiffen the forefoot region of forward outsole section 17 and provide a stable base for incline adjuster 16. A medial force-sensing resistor (FSR) 31 and a lateral FSR 32 are attached to a top surface 33 of bottom support plate 29. As explained below, FSRs 31 and 32 provide outputs that help determine pressures within chambers of incline adjuster 16.

Fulcrum element 34 is attached to top surface 33 of lower support plate 29. Fulcrum element 34 is positioned between FSRs 31 and 32 in a front portion of bottom support plate 29. Fulcrum element 34 may be formed from polyurethane, silicon rubber, EVA, or from one or more other materials that are generally incompressible under loads that result when a wearer of shoe 10 runs. Fulcrum element 34 provides resistance to transverse and longitudinal forces applied to the incline adjuster 16.

Incline adjuster 16 is attached to top surface 33 of lower support plate 29. A medial fluid chamber 35 of incline adjuster 16 is positioned over medial FSR 31. A lateral fluid chamber 36 of incline adjuster 16 is positioned over lateral FSR 32. Incline adjuster 16 includes an aperture 37 through which fulcrum element 34 extends. At least a portion of fulcrum element 34 is positioned between chambers 35 and 36. Additional details of incline adjuster 16 are discussed in connection with subsequent drawing figures. A top support plate 41 is also located in a plantar region of shoe 10 and is positioned over incline adjuster 16. In the embodiment of shoe 10, top support plate 41 is generally aligned with bottom support plate 29. Top support plate 41, which may also be formed from a relatively stiff polymer or polymer composite, provides a stable and relatively non-deformable region against which incline adjuster 16 may push, and which supports the forefoot region of footbed 14.

A forefoot region portion of the midsole 25 underside is attached to the top surface 42 of top support plate 41. Portions of the midsole 25 underside in the heel and side midfoot regions are attached to a top surface 43 of rear outsole section 18. End 19 of forward outsole section 17 is attached to rear outsole section 18 behind the rear-most location 44 of the front edge of section 18 so as to form joint 20. In some embodiments, end 19 may be a tab that slides into a slot formed in section 18 at or near location 44, and/or may be wedged between top surface 43 and the underside of midsole 25.

Also shown in FIG. 3 are a DC-to-high-voltage-DC converter 45 and a printed circuit board (PCB) 46 of a controller 47. Converter 45 converts a low voltage DC electrical signal into a high voltage (e.g., 5000V) DC signal that is applied to electrodes within incline adjuster 16. PCB 46 includes one or more processors, memory and other components and is configured to control incline adjuster 16 through converter 45. PCB 46 also receives inputs from FSRs 31 and 32 and receives electrical power from battery unit 13. PCB 46 and converter 45 may be attached to the top surface of forward outsole section 17 in a midfoot region 48, and may also rest within pockets 28 and 27, respectively, in the underside midsole 25. Wires 23a and 24a electrically connect converter 45 to incline adjuster 16. A terminal 23b on a first end of wire 23a is inserted into a connection passage 39 on the rear edge of incline adjuster 16 and attached to a portion of a conductive trace projecting into an access passage 39, as described in more detail below. A terminal 24b on a first end of wire 24a is inserted into an access passage 40 on the rear edge of incline adjuster 16 and attached to a portion of a separate conductive trace projecting into passage 40, as described in more detail below. In some embodiments, terminals 23b and 24b may simply be portions of conductors of wires 23a and 23b that have been exposed by removing insulating jacket material. In other embodiments, separate terminal structures may be added. Second ends of wires 23a and 24a are connected to appropriate terminals of converter 45. Additional sets of wires, not shown, connect converter 45 and PCB 46 and connect PCB 46 to battery assembly 13.

Figure 4A:
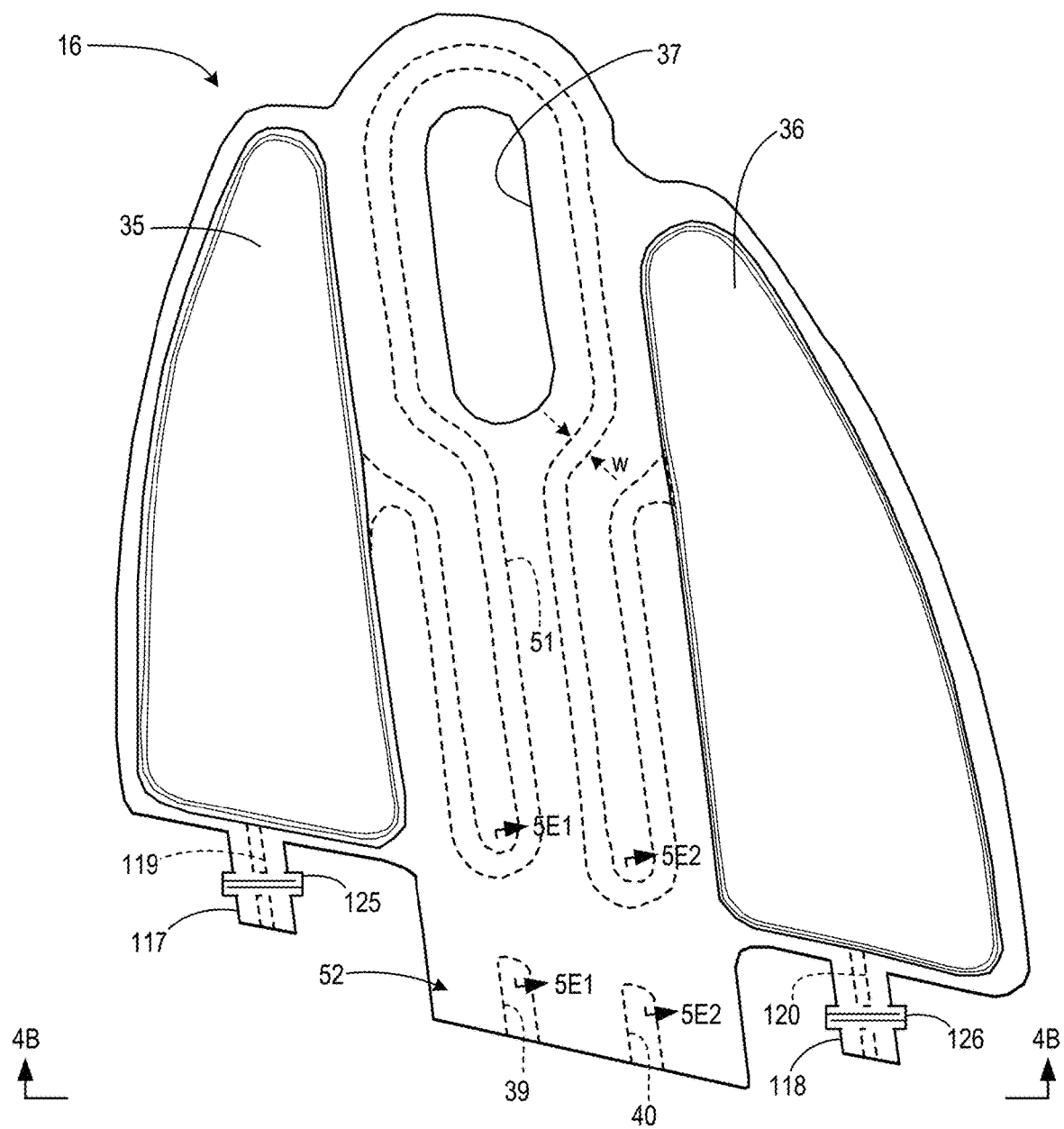
FIG. 4A is an enlarged top view of an incline adjuster of the shoe of FIG. 1.
Figure 4B:
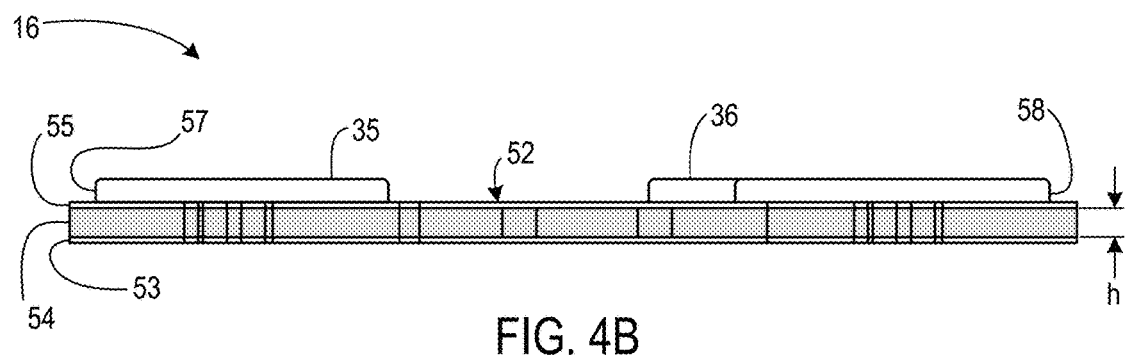
FIG. 4B is a rear edge view of the incline adjuster of FIG. 4A.

FIG. 4A is an enlarged top view of incline adjuster 16. FIG. 4B is a rear edge view of incline adjuster 16 from the location indicated in FIG. 4A. Medial fluid chamber 35 is in fluid communication with lateral fluid chamber 36 through a fluid transfer channel 51. An ER fluid fills chambers 35 and 36 and transfer channel 51. One example of an ER fluid that may be used in some embodiments is sold under the name "RheOil 4.0" by Fludicon GmbH, Landwehrstrasse 55, 64293 Darmstadt, Deutschland (Germany). In the present example, it is assumed that the top of incline adjuster 16 is formed by an opaque layer, and thus transfer channel 51 is indicated in FIG. 4A with broken lines. Access passages 39 and 40 are similarly indicated in FIG. 4A with broken lines. Wires 23a and 24a and terminals 23b and 24b are omitted from FIG. 4A so as to better show details of access passages 39 and 40. In at least some embodiments, however, and as explained below, wires 23a and 24a are attached to incline adjuster prior to filling with ER fluid.

Transfer channel 51 has a serpentine shape so as to provide increased surface area for electrodes within channel 51 to create an electrical field in fluid within channel 51. For example, and as seen in FIG. 4A, channel 51 includes three 180° curved sections joining other sections of channel 51 that cover the space between chambers 35 and 36. In some embodiments, transfer channel 51 may have a maximum height h (FIG. 4B) of 1 millimeter (mm), an average width (w) of 2 mm, and a minimum length along the flow direction of at least 257 mm.

In some embodiments, height of the transfer channel may practically be limited to a range of at least 0.250 mm to not more than 3.3 mm. An incline adjuster constructed of pliable material may be able to bend with the shoe during use. Bending across the transfer channel locally decreases the height at the point of bending. If sufficient allowance is not made, the corresponding increase in electric field strength may exceed the maximum dielectric strength of the ER fluid, causing the electric field to collapse. In the extreme, electrodes could become so close so as to actually touch, with the same resultant electric field collapse.

The viscosity of ER fluid increases with the applied electric field strength. The effect is non-linear and the optimum field strength is in the range of 3 to 6 kilovolts per millimeter (kV/mm). The high-voltage dc-dc converter used to boost the 3 to 5 V of the battery may be limited by physical size and safety considerations to less than 2 W or a maximum output voltage of less than or equal to 10 kV. To keep the electric field strength within the desired range, the height of the transfer channel may therefore be limited in some embodiments to a maximum of about 3.3 mm (10 kV/3 kV/mm).

The width of the transfer channel may be practically limited to a range of at least 0.5 mm to not more than 4 mm. As explained below, an incline adjuster may be constructed of 3 or more layers of thermal plastic urethane film. The layers of film may be bonded together with heat and pressure. During this bonding process, temperatures in portions of the materials may exceed the glass transition temperature when melting so as to bond melted materials of adjoining layers. The pressure during bonding inter-mixes the melted material, but may also extrude a portion of the melted material into the transfer channel preformed within the middle spacer layer of the incline adjuster. The channel may thus be partially filled by this material. At channel widths less than 0.5 mm, the proportion of the material extruded may be a large percentage of the channel width, thereby restricting flow of the ER fluid.

The maximum width of the channel may be limited by the physical space between the two chambers of the incline adjuster. If the channel is wide, the material within the middle layer may become thin and unsupported during construction, and walls of the channel may be easily dislodged. The equivalent series resistance of ER fluid will also decrease as channel width increases, which increases the power consumption. For a shoe size range down to M5.5 (US) the practical width may be limited to less than 4 mm.

The desired length of the transfer channel may be a function of the maximum pressure difference between chambers of the incline adjuster when in use. The longer the channel, the greater the pressure difference that can be withstood. Optimum channel length may be application dependent and construction dependent and therefore may vary among different embodiments. A detriment of a long transfer channel is a greater restriction to fluid flow when the electric field is removed. In some embodiments, practical limits of channel length are in the range of 25 mm to 350 mm.

Incline adjuster 16 includes a medial side fill tab 117 and a lateral side fill tab 118. Tabs 117 and 118 respectively include fill channels 119 and 120. After certain components of incline adjuster 116 have been assembled and bonded, and as described below in further detail, ER fluid may be injected into chambers 35 and 36 and into transfer channel 51 through channel 119 and/or through channel 120. Crimps 125 and 126 may subsequently be formed to close and seal channels 119 and 120.

As seen in FIG. 4B, incline adjuster 16 may include a bottom layer 53, a middle/spacer layer 54, and a top layer 55. Bottom layer 53 forms the bottoms of chambers 35 and 36, the bottom of transfer channel 51, the bottoms of access passages 39 and 40, and the bottoms of fill channels 119 and 120. Middle/spacer layer 54 includes open spaces that form the side walls of chambers 35 and 36, the side walls of transfer channel 51, the side walls of fill channels 119 and 120, and the side walls of passages 39 and 40. Top layer 55 includes two pockets. A medial side pocket 57 forms the top and upper sidewalls of medial chamber 35. A lateral side pocket 58 forms the top and upper sidewalls of lateral chamber 36. Other portions of top layer 55 form the top of transfer channel 51, the tops of fill channels 119 and 120, and the tops of passages 39 and 40. A bottom surface of middle layer 54 may be welded or otherwise bonded to a portion of the top surface of bottom layer 53. A top surface of middle layer 54 may be welded or otherwise bonded to a portion of the bottom surface of top layer 55.

Figure 5B:
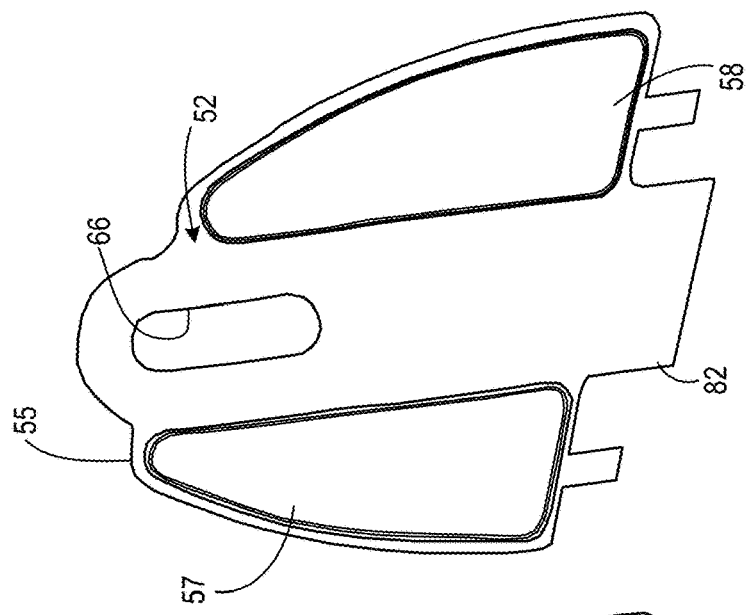
FIG. 5B is a top view of a middle layer of the incline adjuster of FIG. 4A.
Figure 5B:
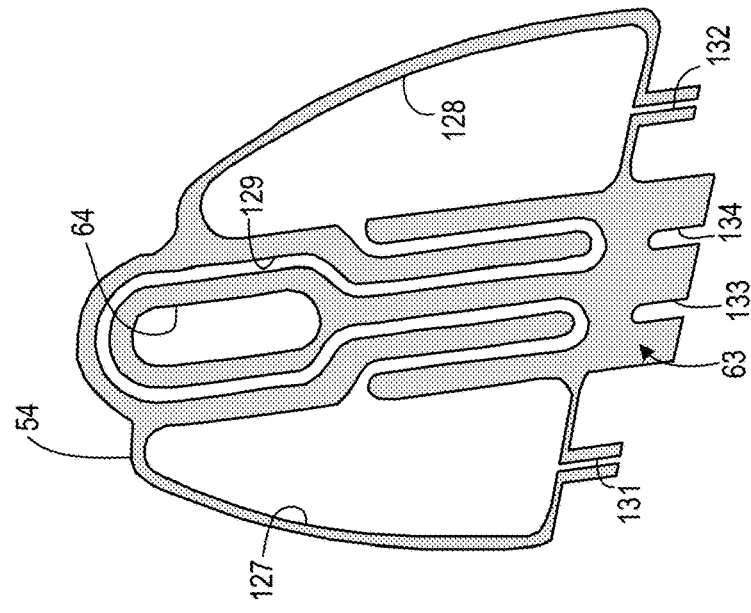
Figure 5A:
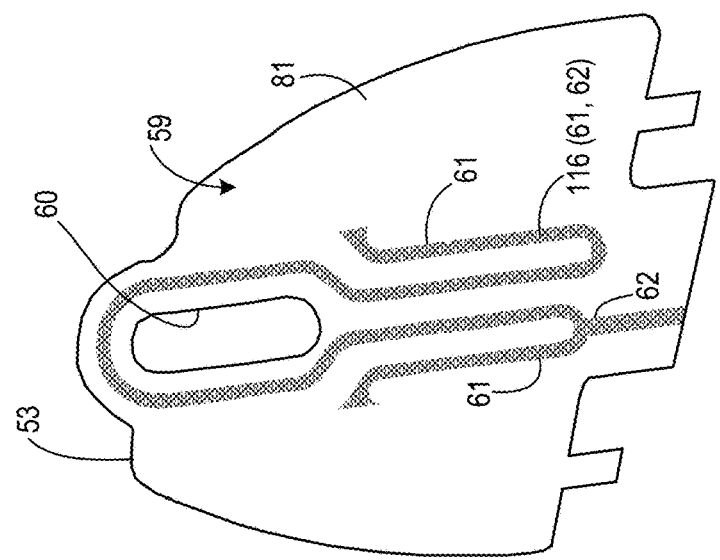
FIG. 5A is a top view of a bottom layer of the incline adjuster of FIG. 4A.

The construction of incline adjuster 16 is further understood by reference to FIGS. 5A through 5E2. FIG. 5A is a top view of bottom layer 53. Bottom layer 53 includes a flat panel 81 having a top surface 59. Except for an opening 60 that is part of fulcrum aperture 37, panel 81 is a continuous sheet. Layer 53 further includes a continuous conductive trace 116 formed on top surface 59. Trace 116 includes a bottom electrode 61 and an extension 62. Electrode 61 is positioned to extend over the portion of layer 53 that forms the bottom of transfer channel 51. As seen in more detail below, electrode 61 follows the path of and coincides with channel 51. Extension 62 branches away from the path of channel 51 and towards the rear edge of bottom layer 53. As explained in more detail below, extension 62 provides a location to electrically connect terminal 23b (FIG. 3) to electrode 61. In some embodiments, conductive trace 116 is a span of conductive ink that has been printed onto surface 59. The conductive ink used to form conductive trace 116 may be, e.g., an ink that comprises silver microparticles in a polymer matrix that includes thermoplastic polyurethane (TPU), and that bonds with TPU of panel 81 to form a flexible conductive layer. One example of such an ink is PE872 stretchable conductor available from E.I. DuPont De Nemours and Company.

In some embodiments, panel 81 is formed from two separate inner and outer sheets of polymeric material that have been laminated together. The outer sheet may be a 0.4 mm sheet of TPU having a Shore A durometer value of 85. An example of such a material includes a sheet formed from TPU resin having part number A92P4637 and available from Huntsman Corporation. In some embodiments, the outer sheet in panel 81 may be a 0.5 mm sheet of polyester-based TPU having a Shore A durometer value of 85. The inner sheet in panel 81 may be a 0.1 mm thick 2-layer polyurethane/polyurethane sheet in which one of the sheet layers is of higher durometer than the other of those two layers. Examples of such 2-layer of polyurethane/polyurethane sheets are commercially available from Bemis Associates Inc.

In some embodiments, layer 53 may be fabricated in the following manner. Prior to forming panel 81, conductive trace 116 is screen printed or otherwise applied to the higher durometer face of the inner sheet. The lower durometer face of the inner sheet may then be placed into contact with an inner face of the outer sheet. The inner and outer sheets may then be laminated together by applying heat and pressure. Bottom layer 53 is then cut from the laminated sheets so that conductive trace 116 is in the proper location relative to outer edges and relative to opening 60.

FIG. 5B is a top view of middle layer 54 showing top surface 63 of middle layer 54. Middle layer 54 includes numerous open spaces that extend from top surface 63 to the bottom surface of middle layer 54. An open space 64 is isolated from other open spaces in layer 54 and is part of fulcrum aperture 37. Open space 127 forms side walls of medial fluid chamber 35. Open space 128 forms side walls of lateral fluid chamber 36. Open space 129 is connected to open spaces 127 and 128 and forms side walls of channel 51. Open spaces 131 and 132 are respectively connected to open spaces 127 and 128 and respectively form side walls of fill channels 119 and 120. Open spaces 133 and 134, which are isolated from each other and from other open spaces in layer 54, respectively form sides walls of access passages 39 and 40. In some embodiments, middle layer 54 is cut from a single sheet of TPU that is harder than TPU used in layers 53 and 55. In some such embodiments, the TPU used for layer 54 is 1.0 mm thick and has a Shore A durometer value of 92. An example of such a material includes a sheet formed from TPU resin having part number A85P44304 and available from Huntsman Corporation. Other examples of material that can be used for layer 54 include 1.0 mm thick TPU having a Shore D durometer value of 72 (e.g., a sheet formed from TPU resin having part number D7101 and available from Argotec, LLC) and 1.0 mm thick TPU having a Shore A durometer value of 87 (e.g., a sheet formed from aromatic polyether-based TPU resin having part number ST-3685-87 and available from Argotec, LLC).

FIG. 5C1 is a top view of top layer 55 showing top surface 52 of top layer 55. In FIG. 5C1, pockets 57 and 58 are convex structures. Medial pocket 57 is molded or otherwise formed into the sheet of top layer 55 on the medial side and forms the top and upper sidewalls of medial fluid chamber 35. Lateral pocket 58 is molded or otherwise formed into the sheet of top layer 55 on the lateral side and forms the top and upper sidewalls of lateral fluid chamber 36. Layer 55 may be formed from a relatively soft and flexible TPU that allows pockets 57 and 58 to easily collapse and expand so as to allow tops of chambers 35 and 36 to change height as ER fluid moves into and out of chambers 35 and 36. In at least some embodiments, and as explained below, top layer 55 may formed from a 2-sheet lamination similar to that used for bottom layer 53.

FIG. 5C2 is a bottom view of top layer 55. Top layer 55 includes a panel 82 having a bottom surface 68. In FIG. 5C2, pockets 57 and 58 are concave structures. Layer 55 further includes a continuous conductive trace 135 formed on bottom surface 68. Trace 135 includes a top electrode 69 and an extension 70. Electrode 69 extends over the portion of layer 55 that forms the top of transfer channel 51. As seen in more detail below, electrode 69 follows the path of and coincides with channel 51. Extension 70 branches away from the path of channel 51 and towards the rear edge of top layer 55. As explained in more detail below, extension 70 provides a location for terminal 24b to electrically connect to electrode 69. In some embodiments, conductive trace 135 is a span of conductive ink that has been printed onto surface 68. The conductive ink used to form conductive trace 135 may be the same type of ink used to form conductive trace 116. FIG. 5C3, a partial area cross-sectional view taken from the location indicated in FIG. 5C2, shows additional details of top electrode 69 and of pocket 58. Pocket 57 and other portions of top electrode may be similar. Except for an opening 66 that is part of fulcrum aperture 37, panel 82 is shown in FIG. 5C2 as a continuous sheet. In other embodiments, there may be additional openings or gaps in panel 82 (e.g., between portions of trace 135).

Panel 82 may comprise laminated inner and outer sheets of the same materials used to create panel 81. In some embodiments, layer 55 may be fabricated in the following manner. Prior to forming panel 82, conductive trace 135 is screen printed or otherwise applied to the higher durometer face of the inner sheet. The lower durometer face of the inner sheet may then be placed into contact with an inner face of the outer sheet. The two sheets may then be laminated together by applying heat and pressure. The laminated sheets are then thermoformed using a mold having cavities corresponding to the shapes of pockets 57 and 58. Care is taken during the thermoforming process to avoid damaging trace 135 and to properly position trace 135 relative to pockets 57 and 58. Layer 55 is then cut from the laminated and thermoformed sheets so that conductive trace 135 is in the proper location relative to outer edges and relative to opening 66.

FIG. 5D1 shows a first assembly operation when fabricating incline adjuster 16. As part of the first assembly operation, a first patch 139 is placed over a portion of conductive trace 116. In particular, patch 139 spans the width of electrode 61 in the region where branch 62 joins electrode 61, as well as the portion of branch 62 adjacent to electrode 61. In some embodiments, and as shown in FIG. 5D1, patch 139 is wider than branch 62. Patch 139 may be, e.g., a thin strip of TPU. In some embodiments the 0.1 mm inner sheet material used for panels 81 and 82 may also be used for patch 139, with the higher durometer side of the material placed toward trace 116. After placement of patch 139, middle layer 54 is placed onto bottom layer 53 so that a bottom surface 67 of middle layer 54 is in contact with top surface 59 of panel 81, and so that patch 139 is interposed between top surface 59 and bottom surface 67, as well as between portions of trace 116 and bottom surface 67. In some embodiments, alignment holes (not shown) may be formed in layers 53, 54, and 55 to assist in positioning during the operation of FIG. 5D1 and in subsequent assembly operations.

FIG. 5D2 shows a second assembly operation when fabricating incline adjuster 16. The left side of FIG. 5D2 shows layers 53 and 54 and patch 139 after the assembly operation of FIG. 5D1. Edges of patch 139 covered by middle layer 54 are indicated with broken lines. Electrode 61 extends over the portion of the layer 53 top surface that forms a bottom of channel 51. A portion of extension 62 extends over the portion of the layer 53 top surface that forms a bottom of access passage 39.

In the second assembly operation of FIG. 5D2, a second patch 140 is placed over a portion of conductive trace 135. In particular, patch 140 spans the width of electrode 69 in the region where branch 70 joins electrode 69, as well as the portion of branch 70 adjacent to electrode 69. In some embodiments, and as shown in FIG. 5D2, patch 140 is wider than branch 70. Patch 140 may also be, e.g., a thin strip of TPU. In some embodiments, patch 140 is cut from the same material used for patch 139 and is positioned with the higher durometer face toward trace 135. After placement of patch 140, assembled layers 53 and 54 (with interposed patch 139) are placed onto top layer 55 so that the bottom surface 68 of panel 82 is in contact with top surface 63 of middle layer 54, and so that patch 140 is interposed between top surface 63 and bottom surface 68, as well as between portions of trace 135 and top surface 63.

FIG. 5D3 shows layers 53, 54, and 55 after the assembly operation of FIG. 5D2. The positions of patch 140, channel 51, channels 119 and 120, and passages 39 and 40 are indicated with broken lines. Although not visible in FIG. 5D3, electrode 69 extends over the portion of the layer 55 bottom surface that forms a top of channel 51. A portion of extension 70 extends over the portion of the layer 55 bottom surface that forms a top of access passage 40.

Figures 8A, 8B:
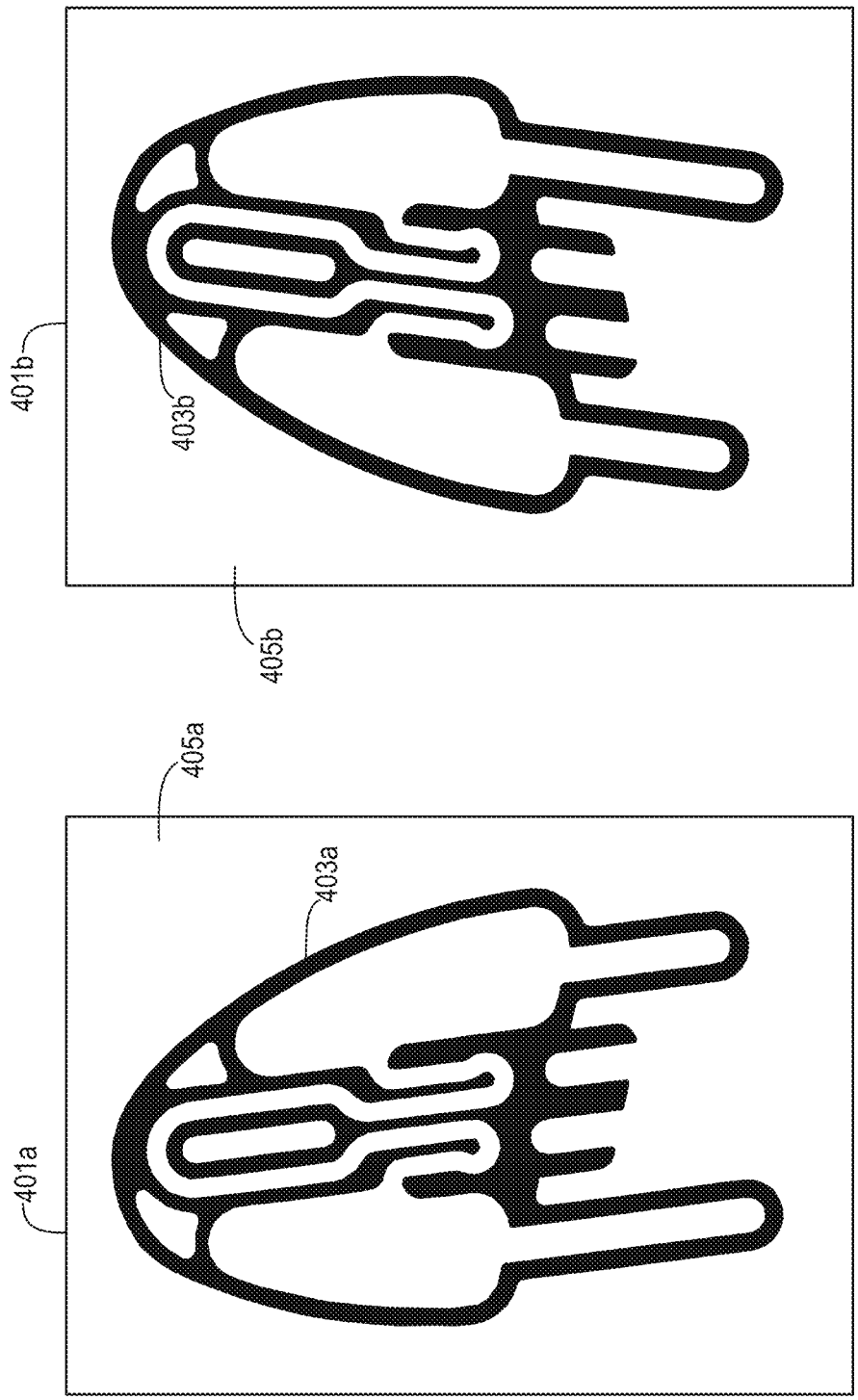
FIGS. 8A and 8B are top views of two sides of a first RF welding tool according to some embodiments.

Layers 53, 54, and 55 and patches 139 and 140 may be bonded after assembly by RF (radio frequency) welding. In some embodiments, a multi-step RF welding operation is performed. FIGS. 8A and 8B are top views of two sides of an RF welding tool used in the first welding operation in some embodiments. FIG. 8A shows a side 401a that contacts the exposed bottom surface of bottom layer 53. Side 401a includes a wall 403a that extends outward from a planar base 405a. FIG. 8B shows a side 401b that contacts the exposed top surface 52 of top layer 55. Side 401b includes a wall 403b that extends outward from a planar base 405b. Wall 403b has a height above base 405b that is greater than the heights of pockets 57 and 58. As can be appreciated by comparing FIGS. 8A and 8B with FIG. 5D3, walls 403a and 403b include portions that correspond to the portions of middle layer 54 that define the shape of channel 51. Walls 403a and 403b further include portions that correspond to portions of middle layer 54 defining the sides of chambers 35 and 36, portions that correspond to portions of middle layer 54 defining passages 39 and 40, portions that correspond to portions of middle layer 54 defining the region between passages 39 and 40 and channel 51, and portions that correspond to portions of middle layer 54 defining the sides of channels 119 and 120.

Sides 401a and 401b may be attached to opposing sides of a fixture that is configured to press sides 401a and 401b together while RF frequency electrical power is applied to sides 401a and 401b. During the first RF welding operation, the assembly of FIG. 5D3 is placed between sides 401a and 401b, with side 401a contacting the bottom surface of layer 53 and side 401b contacting the top surface of layer 55, and with edges of walls 403a and 403b aligned with their corresponding portions of middle layer 54. In some embodiments, sides 401a and 401b are pressed together against the assembly (during application of electrical power) so as to compress regions of the assembly between the tops of walls 403a and 403b to a thickness at the end of the first RF welding operation that is 85% of the thickness prior to the first RF welding operation.

Subsequently, the assembly of FIG. 5D3 is subjected to a second RF welding operation. FIGS. 8C and 8D are top views of two sides of an RF welding tool used in the second welding operation in some embodiments. FIG. 8C shows a side 402a that contacts the exposed bottom surface of bottom layer 53. Side 402a includes a wall 404a that extends outward from a planar base 406a. FIG. 8B shows a side 402b that contacts the exposed top surface 52 of top layer 55. Side 402b includes a wall 404b that extends outward from a planar base 406b. Wall 404b has a height above base 406b that is greater than the heights of pockets 57 and 58. As can be appreciated by comparing FIGS. 8C and 8D with FIG. 5D3, walls 404a and 404b include portions that correspond to the portions of middle layer 54 that define the edges of chambers 35 and 36.

In the second RF welding operation, the assembly of FIG. 5D3 is placed between sides 402a and 402b, with side 402a contacting the bottom surface of layer 53 and side 402b contacting the top surface of layer 55, and with edges of walls 404a and 404b aligned with their corresponding portions of middle layer 54. In some embodiments, sides 402a and 402b are pressed together against the assembly (during application of electrical power) so as to compress regions of the assembly between the tops of walls 404a and 404b to a thickness at the end of the second RF welding operation that is 65% of the thickness at the start of the second RF welding operation.

In some embodiments, an intermediate RF welding operation may be performed between the first and second welding operations. In some such embodiments, tubes are inserted into the rear ends of channels 119 and 120. Those tubes are then sealed in place by applying sides of an RF welding tool around the rear ends of tabs 117 and 118. Those tubes and the portions of tabs 117 and 118 welded to those tubes may then be cut away after incline adjuster 16 is filled with ER fluid.

As previously indicated, incline adjuster 16 is configured for installation in a right shoe of a pair. An incline adjuster configured for installation in a left shoe of that pair may be a mirror image of incline adjuster 16. Accordingly, sides of RF welding tools used to fabricate that left shoe incline adjuster may be mirror images of the tool sides shown in FIGS. 8A through 8D.

At the conclusion of the RF welding operations to bond layers 53, 54, and 55 and interposed patches 139 and 140, terminals 23b and 24b may be attached to portions of extensions 62 and 70 exposed in access passages 39 and 40. In some embodiments, that attachment may be performed using operations described in the US provisional patent application No. 62/260,890, titled "Electrorheological Fluid Structure With Attached Conductor and Method of Fabrication", which application is incorporated by reference herein. After attachment of terminals 23b and 24b, incline adjuster 16 may be filled with ER fluid through fill channel 119 and/or through fill channel 120. After filling, channels 119 and 120 are closed and sealed by applying an RF tool to exposed top and bottom surfaces of tabs 117 and 118 so as to form crimps 125 and 126. In some embodiments, filling of incline adjuster 116 may be performed using operations described in the U.S. provisional patent application No. 62/260,897, titled "Method of Filling Electrorheological Fluid Structure", which application is incorporated by reference herein.

FIGS. 5E1 and 5E2 are partially schematic area cross-sectional views, taken from the locations indicated in FIG. 4A, showing incline adjuster 16 after assembly. As previously indicated, terminals 23b and 24b were omitted from FIG. 4A, and thus are also omitted from FIGS. 5E1 and 5E2. Moreover, and as indicated above, various regions of incline adjuster 16 may be compressed during RF welding portions of the assembly process. No attempt is made to accurately depict the compressed cross-sectional profile in FIGS. 5E1 and 5E2.

As seen in FIGS. 5E1 and 5E2, ER fluid 121 fills transfer channel 51. Electrodes 61 and 69 are located at the top and bottom, respectively, of channel 51. Although FIGS. 5E1 and 5E2 shows edges of electrodes 61 and 69 located near edges of opening 129, in some embodiments electrodes 61 and 69 may be formed wider so as to extend further under and over layer 54 throughout some or all of the length of transfer channel 51.

The laminated constructions of layers 53 and 55 are also visible in FIGS. 5E1 and 5E2. Panel 81 of layer 53 includes an inner sheet 164 bonded to an outer sheet 163. Panel 82 of layer 55 similarly includes an inner sheet 162 bonded to an outer sheet 161. As indicated above, sheets 161 and 163 may be formed from the same material in some embodiments, as may sheets 162 and 164.

As seen in FIG. 5E1, extension 62 is connected to bottom electrode 61 and extends from transfer channel 51 to access passage 39. In particular, extension 62 is located between bottom surface 67 of layer 54 and top surface 59 of panel 81. As indicated above, layer 54 tends to extrude into transfer channel 51 during RF welding operations. This extrusion may tend to tear portions of trace 116 at the interface between layer 54 and layer 53 near edges of opening 129. In many portions of electrode 61, such tearing is not a problem. At the junction of electrode 61 and extension 62, however, such tearing may result in a loss of the electrical connection between electrode 61 and the portion of extension 62 to which terminal 23b is connected. Patch 139 is placed between layers 54 and 53 to prevent such tearing. As seen in FIG. 5E1, patch 139 spans channel 51 in the region of the connection between electrode 61 and extension 62. When layer 54 extrudes into channel 51 during RF welding, patch 139 provides strain relief. In particular, patch 139 absorbs the shear stress and prevents transfer of all of that shear stress to the region of trace 116 forming the connection between electrode 61 and extension 62. Similarly, by extending along the length of extension 62 between channel 51 and passage 39 and into passage 39, patch 139 prevents tearing of extension 62 at the interface between layers 53 and 54 in passage 39.

As seen in FIG. 5E2, extension 70 is connected to top electrode 69 and extends from transfer channel 51 to access passage 40. In particular, extension 70 is located between bottom surface 68 of panel 82 and top surface 63 of layer 54. Patch 140 spans channel 51 in the region of the connection between electrode 69 and extension 70. Patch 140 further extends along the length of extension 70, between channel 51 and passage 40, and into passage 40. Similar to patch 139, patch 140 provides strain relief and prevents tearing of trace 135 in the region of trace 135 forming the connection between electrode 69 and extension 70 or in the region of extension 70 at the interface between layers 54 and 55 in passage 40.

Figure 6:
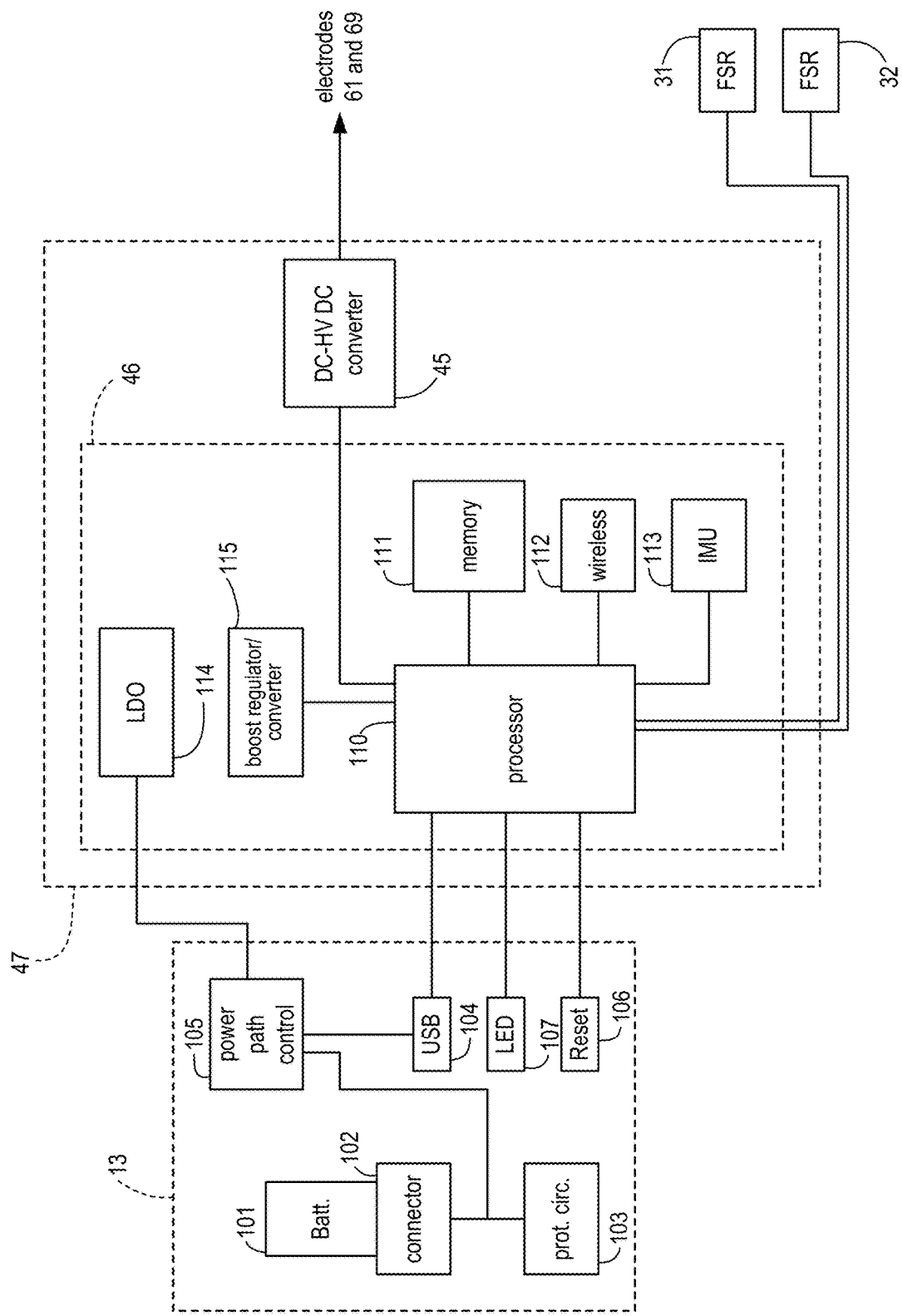
FIG. 6 is a block diagram showing electrical system components in the shoe of FIG. 1.

FIG. 6 is a block diagram showing electrical system components of shoe 10. Individual lines to or from blocks in FIG. 6 represent signal (e.g., data and/or power) flow paths and are not necessarily intended to represent individual conductors. Battery pack 13 includes a rechargeable lithium ion battery 101, a battery connector 102, and a lithium ion battery protection IC (integrated circuit) 103. Protection IC 103 detects abnormal charging and discharging conditions, controls charging of battery 101, and performs other conventional battery protection circuit operations. Battery pack 13 also includes a USB (universal serial bus) port 104 for communication with controller 47 and for charging battery 101. A power path control unit 105 controls whether power is supplied to controller 47 from USB port 104 or from battery 101. A Reset button 106 activates or deactivates controller 47 and battery pack 13. An LED (light emitting diode) 107 indicates whether the controller is ON and the state of the electrical field. The above-described individual elements of battery pack 13 may be conventional and commercially available components that are combined and used in the novel and inventive ways described herein.

Controller 47 includes the components housed on PCB 46, as well as converter 45. In other embodiments, the components of PCB 46 and converter 45 may be included on a single PCB, or may be packaged in some other manner. Controller 47 includes a processor 110, a memory 111, an inertial measurement unit (IMU) 113, and a low energy wireless communication module 112 (e.g., a BLUETOOTH communication module). Memory 111 stores instructions that may be executed by processor 110 and may store other data. Processor 110 executes instructions stored by memory 111 and/or stored in processor 110, which execution results in controller 47 performing operations such as are described herein and in U.S. patent application Ser. No. 14/725,218, titled "Footwear Including an Incline Adjuster" and filed May 29, 2015, which application (in its entirety) is incorporated by reference herein. As used herein, instructions may include hard-coded instructions and/or programmable instructions.

IMU 113 may include a gyroscope and an accelerometer and/or a magnetometer. Data output by IMU 113 may be used by processor 110 to detect changes in orientation and motion of shoe 10, and thus of a foot wearing shoe 10. As explained in more detail below, processor 10 may use such information to determine when an incline of a portion of shoe 10 should change. Wireless communication module 112 may include an ASIC (application specific integrated circuit) and be used to communicate programming and other instructions to processor 110, as well as to download data that may be stored by memory 111 or processor 110.

Controller 47 includes a low-dropout voltage regulator (LDO) 114 and a boost regulator/converter 115. LDO 114 receives power from battery pack 13 and outputs a constant voltage to processor 110, memory 111, wireless communication module 112, and IMU 113. Boost regulator/converter 115 boosts a voltage from battery pack 13 to a level (e.g., 5 volts) that provides an acceptable input voltage to converter 45. Converter 45 then increases that voltage to a much higher level (e.g., 5000 volts) and supplies that high voltage across electrodes 61 and 69 of incline adjuster 16. Boost regulator/converter 115 and converter 45 are enabled and disabled by signals from processor 110. Controller 47 further receives signals from medial FSR 31 and from lateral FSR 32. Based on those signals from FSRs 31 and 32, processor 110 determines whether forces from a wearer foot on medial fluid chamber 35 and on lateral fluid chamber 36 are creating a pressure within chamber 35 that is higher than a pressure within chamber 36, or vice versa.

The above-described individual elements of controller 47 may be conventional and commercially available components that are combined and used in the novel and inventive ways described herein. Moreover, controller 47 is physically configured, by instructions stored in memory 111 and/or processor 110, to perform the herein described novel and inventive operations in connection with controlling transfer of fluid between chambers 35 and 36 so as to adjust the incline of the forefoot portion of the shoe 10 footbed 14.

FIGS. 7A through 7D are partially schematic area cross-sectional diagrams showing operation of incline adjuster 16, according to some embodiments, when going from a minimum incline condition to a maximum incline condition. In the minimum incline condition, an incline angle α of the top plate relative to the bottom plate has a value of $α_{min}$ representing a minimum amount of incline sole structure 12 is configured to provide in the forefoot region. In some embodiments, $α_{min}=0°$. In the maximum incline condition, the incline angle α has a value of $α_{max}$ representing a maximum amount of incline sole structure 12 is configured to provide. In some embodiments, $α_{max}$ is at least 5°. In some embodiments, $α_{max}=10°$. In some embodiments, $α_{max}$ may be greater than 10°.

In FIGS. 7A-7D, bottom plate 29, incline adjuster 16, top plate 41, FSR 31, FSR 32, and fulcrum element 34 are represented, but other elements are omitted for simplicity. FIG. 7E is a top view of incline adjuster 16 (in a minimum incline condition) and bottom plate 29 showing the approximate locations of the sectioning lines corresponding to the views of FIGS. 7A-7D. Top plate 41 is omitted from FIG. 7E, but the peripheral edge of top plate 41 would generally coincide with that of bottom plate 29 if top plate 41 were included In FIG. 7E. Although fulcrum element 34 would not appear in an area cross-section according to the section lines of FIG. 7E, the general position of fulcrum element 34 relative to the medial and lateral sides of other elements in FIGS. 7A-7D is indicated with broken lines.

Also indicated in FIGS. 7A through 7D are a lateral side stop 123 and a medial side stop 122. Medial side stop 122 supports the medial side of top plate 41 when incline adjuster 16 and top plate 41 are in the maximum incline condition. Lateral side stop 123 supports the lateral side of top plate 41 when incline adjuster 16 and top plate 41 are in the minimum incline condition. Lateral side stop 123 prevents top plate 41 from tilting toward the lateral side. Because runners proceed around a track in a counterclockwise direction during a race, a wearer of shoe 10 will be turning to his or her left when running on curved portions of a track. In such a usage scenario, there would be no need to incline the footbed of a right shoe sole structure toward the lateral side. In other embodiments, however, a sole structure may be tiltable to either medial or lateral side.

In some embodiments, a left shoe from a pair that includes shoe 10 may be configured in a slightly different manner from what is shown in FIGS. 7A-7D. For example, a medial side stop may be at a height similar to that of lateral side stop 123 of shoe 10, and a lateral side stop may be at a height similar to that of medial side stop 122 of shoe 10. In such embodiments, the top plate of the left shoe moves between a minimum incline condition and maximum incline condition in which the top plate is inclined to the lateral side.

The locations of lateral side stop 123 and of medial side stop 122 are represented schematically in FIGS. 7A-7D, and are not shown in previous drawing figures. In some embodiments, lateral side stop 123 may be formed as a rim on the lateral side or edge of bottom plate 29. Similarly, medial side stop 122 my be formed as a rim on the medial side or edge of bottom plate 29.

Figure 7A:
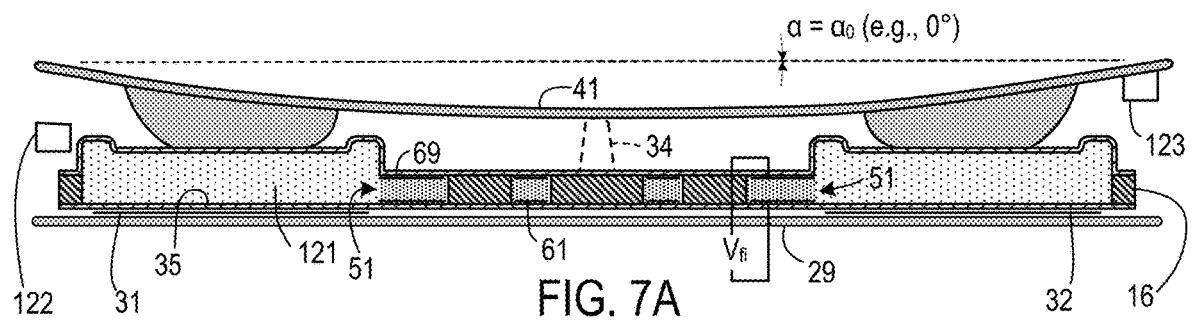
FIGS. 7A through 7D are partially schematic area cross-sectional diagrams showing operation of the incline adjuster of the shoe of FIG. 1 when going from a minimum incline condition to a maximum incline condition.

FIG. 7A shows incline adjuster 16 when top plate 41 is in a minimum incline condition. Shoe 10 may be configured to place top plate 41 into the minimum incline condition when a wearer of shoe 10 is standing or is in starting blocks about to begin a race, or when the wearer is running a straight portion of a track. In FIG. 7A, controller 47 is maintaining the voltage across electrodes 61 and 69 at one or more flow-inhibiting voltage levels ($V=V_{fi}$). In particular, the voltage across electrodes 61 and 69 is high enough to generate an electrical field having a strength sufficient to increase the viscosity of ER fluid 121 in transfer channel 51 to a viscosity level that prevents flow out of or into chambers 35 and 36. In some embodiments, a flow-inhibiting voltage level $V_{fi}$ is a voltage sufficient to create a field strength between electrodes 61 and 69 of between 3 kV/mm and 6 kV/mm. In FIGS. 7A through 7D, light stippling is used to indicate ER fluid 121 having a viscosity that is at a normal viscosity level, i.e., unaffected by an electrical field. Dense stippling is used to indicate ER fluid 121 in which the viscosity has been raised to a level that blocks flow through channel 51. Because ER fluid 121 cannot flow through channel 51 under the conditions shown in FIG. 7A, the incline angle α of top plate 41 does not change if the wearer of shoe 10 shifts weight between medial and lateral sides of shoe 10.

Figure 7B:
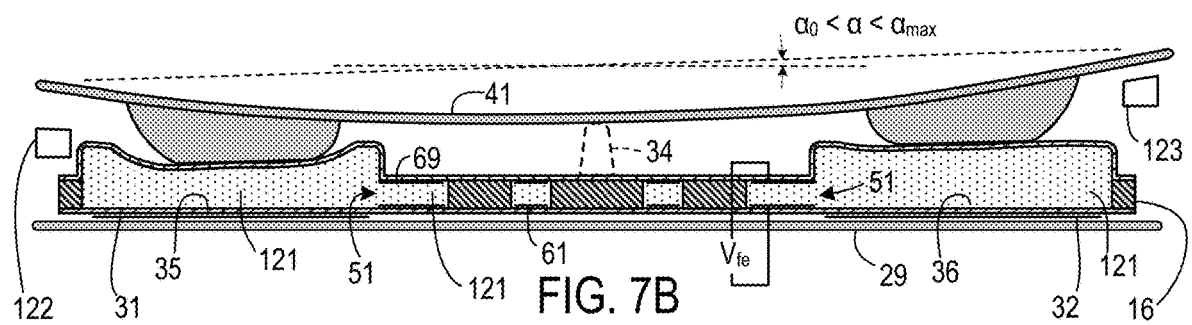

FIG. 7B shows incline adjuster 16 soon after controller 47 has determined that top plate 41 should be placed into the maximum incline condition, i.e., inclined to $\alpha=\alpha_{max}$. In some embodiments, controller 47 makes such a determination based on a number of steps taken by the shoe 10 wearer. Upon determining that top plate 41 should be inclined to $\alpha_{max}$, controller 47 determines if the foot wearing shoe 10 is in a portion of the wearer gait cycle in which shoe 10 is in contact with the ground. Controller 47 also determines if a difference $\Delta P_{M-L}$ between the pressure $P_M$ of ER fluid 121 in medial side chamber 35 and the pressure $P_L$ of ER fluid 121 in lateral side chamber 36 is positive, i.e., if $P_M-P_L$ is greater than zero. If shoe 10 is in contact with the ground and $\Delta P_{M-L}$ is positive, controller 47 reduces the voltage across electrodes 61 and 69 to a flow-enabling voltage level $V_{fe}$. In particular, the voltage across electrodes 61 and 69 is reduced to a level that is low enough to reduce the strength of the electrical field in transfer channel 51 so that the viscosity of ER fluid 121 in transfer channel 51 is at a normal viscosity level.

Upon reducing the voltage across electrodes 61 and 69 to a $V_{fe}$ level, the viscosity of ER fluid 121 in channel 51 drops. ER fluid 121 then begins flowing out of chamber 35 and into chamber 36. This allows the medial side of top plate 41 to begin moving toward bottom plate 29, and the lateral side of top plate 41 to begin moving away from bottom plate 29. As a result, the incline angle α begins to increase from $\alpha_{min}$.

In some embodiments, controller 47 determines if shoe 10 is in a step portion of the gait cycle and in contact with the ground based on data from IMU 113. In particular, IMU 113 may include a three-axis accelerometer and a three-axis gyroscope. Using data from the accelerometer and gyroscope, and based on known biomechanics of a runner foot, e.g., rotations and accelerations in various directions during different portions of a gait cycle, controller 47 can determine whether the right foot of the shoe 10 wearer is stepping on the ground. Controller 47 may determine if $\Delta P_{M-L}$ is positive based on the signals from FSR 31 and FSR 32. Each of those signals corresponds to magnitude of a force from a wearer foot pressing down on the FSR. Based on the magnitudes of those forces and on the known dimensions of chambers 35 and 36, controller 47 can correlate the values of signals from FSR 31 and FSR 32 to a magnitude and a sign of $\Delta P_{M-L}$.

Figure 7C:
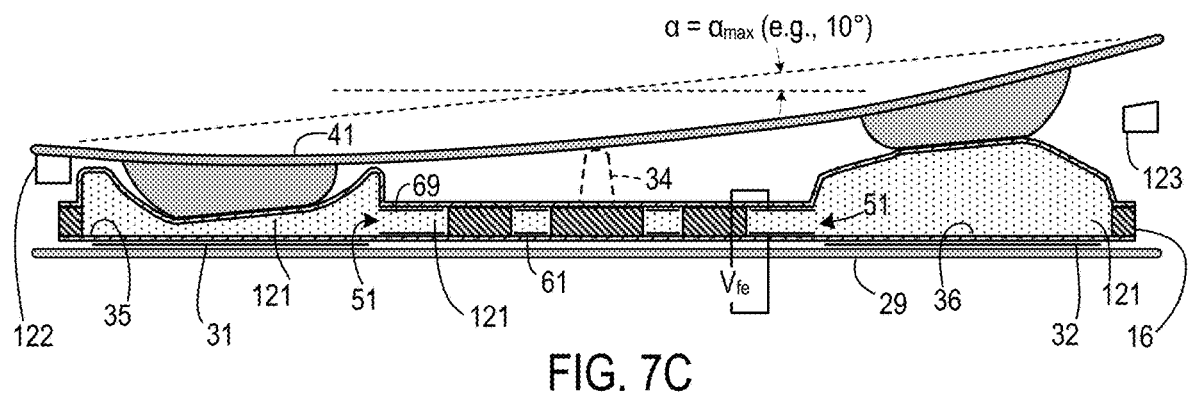
Figure 7D:
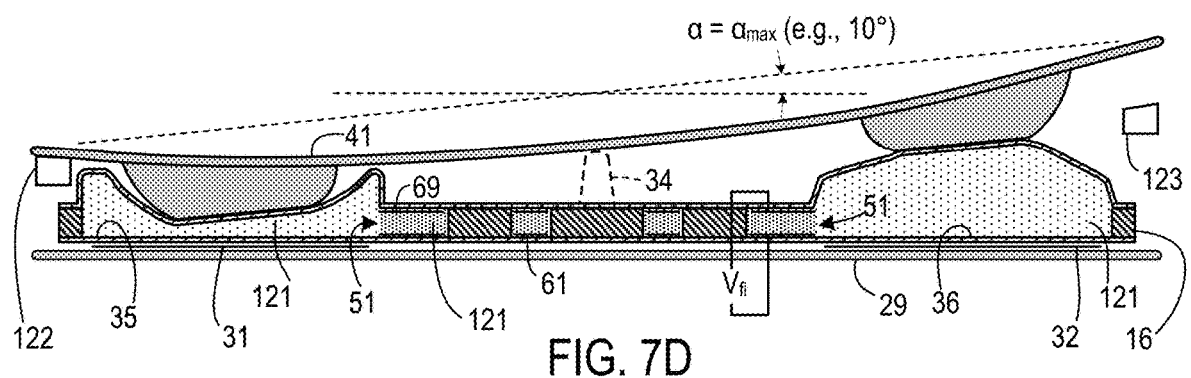
Figure 7E:
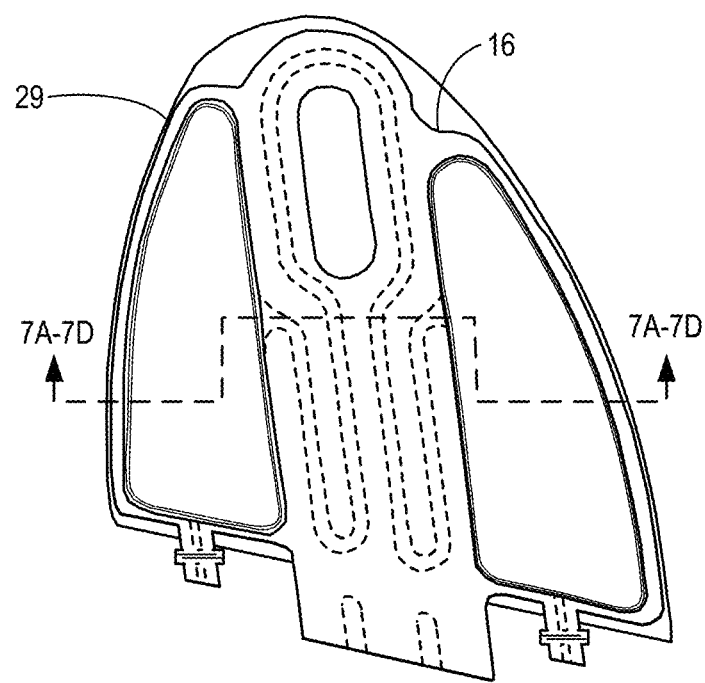
FIG. 7E is a top view of the incline adjuster and a bottom plate of the shoe of FIG. 1, and showing the approximate locations of sectioning lines corresponding to the views of FIGS. 7A-7D.

FIG. 7C shows incline adjuster 16 very soon after the time associated with FIG. 7B. In FIG. 7C, top plate 41 has reach the maximum incline condition. In particular, the incline angle α of top plate 41 has reached $\alpha_{max}$. Medial stop 122 prevents incline angle α from exceeding $\alpha_{max}$. FIG. 7D shows incline adjuster 16 very soon after the time associated with FIG. 7C. In FIG. 7D, controller 47 has raised the voltage across electrodes 61 and 69 to a flow-inhibiting voltage level $V_{fi}$. This prevents further flow through transfer channel 51 and holds top plate 41 in the maximum incline condition. During a normal gait cycle, downward force of a right foot on a shoe is initially higher on the lateral side as the forefoot rolls to the medial side. If flow through channel 51 were not prevented, the initial downward force on the lateral side of the wearer right foot would decrease incline angle α.

In some embodiments, a shoe may include an incline adjuster and other components that are configured to incline a different portion of a shoe footbed. As but one example, a basketball shoe may include an incline adjuster similar to incline adjuster 16, but having one chamber positioned in a medial midfoot or heel region, and another chamber positioned in a lateral midfoot or heel region, and with shapes of the chambers modified to match those positions. A controller of such a shoe could be configured to perform operations similar to those described above upon determining that a wearer's body position corresponds to a need to incline the midfoot and/or heel, and upon determining that such inclination is no longer needed. When cutting to the left, for example, a right shoe having a midfoot and heel region inclined medially could provide additional support and stability. A controller could be configured to determine that a cutting motion is occurring based on position and/or movement of the wearer's torso, and/or based on a sudden increase in pressure on a medial side of the shoe, and/or based on sensors located within an upper that indicate the heel region has tilted relative to the forefoot region.

A controller need not be located within a sole structure. In some embodiments, for example, some or all components of a controller could be located with the housing of a battery assembly such as battery assembly 13 and/or in another housing positioned on a footwear upper.

As can be appreciated from the above, incline adjuster 16 is a structure holding an ER fluid. Other embodiments include other structures that hold or that are configured to hold ER fluid and that have features similar to those described in connection with incline adjuster 16, but that may differ from incline adjuster 16 in one or more respects. Such structures, referred to herein as ER fluid structures for convenience, may be used in foot wear or in other applications.

In some embodiments, an ER fluid structure may include chambers having sizes and/or shapes different from those shown in above. Similarly, a transfer channel may have other sizes and/or shapes.

In some embodiments, an ER fluid structure may only have a single chamber, with one end of a transfer channel left open. That open transfer channel may subsequently be connected to another structure having an ER fluid reservoir or chamber, to a pump configured to transfer ER fluid from a separate reservoir or chamber, or to some other component.

In some embodiments, and ER fluid structure may not include chambers. For example, such a structure could be similar to the central portion of incline adjuster 16 that includes transfer channel 51 and access passages 39 and 40. Instead of connecting to chambers within the structure, however, the transfer channel ends may be open and connectable to separate components. Such a structure could be used, e.g., as a valve in an ER fluid system.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from herein-described embodiments are the within the scope of the invention. In the claims, a reference to a potential or intended wearer or a user of a component does not require actual wearing or using of the component or the presence of the wearer or user as part of the claimed invention.

The invention claimed is:

1. A method comprising:
   positioning a first layer of polymeric material, a second layer of polymeric materials and a first patch so that:
   a first conductive trace forming a portion of a surface of the first layer at least partially coincides with a channel having a portion formed in the second layer, wherein the second layer includes a first surface and a second surface, and wherein the first conductive trace includes a first extension that: (i) branches away from a path of the channel, (ii) passes along the first surface of the second layer, and (iii) is exposed in an open space of a first access passage defined in part by the second layer,
   a portion of the surface of the first layer is in contact with a portion of the first surface of the second layer,
   the first patch is interposed between the surface of the first layer and the first surface of the second layer, and
   the first patch spans the channel and covers the first extension of the first conductive trace from the channel to the first access passage; and
   bonding the first layer, the second layer, and the first patch.

2. The method of claim 1, further comprising attaching a terminal to a portion of the first extension exposed in the first access passage.

3. The method of claim 1, wherein each of the first layer, the second layer, and the first patch comprises a thermoplastic polyurethane.

4. The method of claim 1, wherein the bonding comprises bonding the first layer, the second layer, the first patch, and a third layer to define a first chamber in fluid communication with the channel.

5. The method of claim 4, further comprising filling the bonded first layer, second layer, and third layers with electrorheological fluid.

6. The method of claim 1, wherein the bonding comprises radio frequency (RF) welding.

7. The method of claim 1, wherein:
   the positioning comprises positioning the second layer and a third layer so that a second conductive trace forming a portion of a surface of the third layer at least partially coincides with the channel, and so that a portion of the surface of the third layer is in contact with a portion of the second surface of the second layer, and
   the bonding comprises bonding the second layer and the third layers.

8. The method of claim 7, wherein the bonding comprises bonding the first layer, the second layer, the first patch, and the third layer to define a first chamber in fluid communication with the channel and a second chamber in fluid communication with the channel.

9. The method of claim 7, wherein:
   the positioning comprises positioning the second layer, the third layer, and a second patch so that the second patch is interposed between the second surface of the second layer and the surface of the third layer, and so that the second patch spans the channel and covers a portion of the second conductive trace, and
   the bonding comprises bonding the second layer, the third layer, and the second patch.

10. The method of claim 9, wherein the positioning the second patch comprises positioning the second patch to cover a portion of a second extension of the second conductive trace, wherein the second extension branches away from the path of the channel and passes across the second surface of the second layer.

11. The method of claim 10, wherein the bonding comprises bonding the first layer, the second layer, the third layer, the first patch, and the second patch to define a first chamber in fluid communication with the channel.

12. The method of claim 10, wherein the bonding comprises bonding the first layer, the second layer, the third layer, the first patch, and the second patch to define a first chamber in fluid communication with the channel and a second chamber in fluid communication with the channel.

13. The method of claim 9, further comprising filling the bonded first layer, second layer, and third layers with electrorheological fluid.

14. The method of claim 9, wherein each of the first layer, the second layer, the third layer, the first patch, and the second patch comprises a thermoplastic polyurethane.

15. The method of claim 9, wherein the bonding comprises radio frequency (RF) welding.

16. The method of claim 9, wherein the bonding comprises a two stage radio frequency (RF) welding.

17. The method of claim 1, wherein:
the positioning comprises positioning the second layer, a third layer, and a second patch so that:
(a) a second conductive trace forming a portion of a surface of the third layer at least partially coincides with the channel,
(b) a portion of the surface of the third layer is in contact with a portion of the second surface of the second layer, wherein the second conductive trace includes a second extension that: (i) branches away from the path of the channel, (ii) passes along the second surface of the second layer, and (iii) is exposed in an open space of a second access passage defined in part by the second layer, and
(c) the second patch is interposed between the surface of the third layer and the second surface of the second layer, wherein the second patch spans the channel and covers the second extension of the second conductive trace from the channel to the second access passage; and
the bonding comprises bonding the second layer, the third layer, and the second patch.

18. The method of claim 17, wherein the bonding comprises bonding the first layer, the second layer, the first patch, the second patch, and the third layer to define a first chamber in fluid communication with the channel and a second chamber in fluid communication with the channel.

19. The method of claim 17, further comprising attaching a terminal to a portion of the second extension exposed in the second access passage.

20. The method of claim 17, further comprising: attaching a first terminal to a portion of the first extension exposed in the first access passage, and attaching a second terminal to a portion of the second extension exposed in the second access passage.

* * * * *

UNITED STATES PATENT AND TRADEMARK OFFICE
CERTIFICATE OF CORRECTION

PATENT NO. : 11,596,200 B2
APPLICATION NO. : 16/903576
DATED : March 7, 2023
INVENTOR(S) : Walker et al.

It is certified that error appears in the above-identified patent and that said Letters Patent is hereby corrected as shown below:

In the Claims

Column 18, Claim 1, Line 4:
Delete "materials" and insert --material,-- therefor Column 18, Claim 5, Line 37:
Delete "layers" and insert --layer-- therefor Column 18, Claim 7, Line 50:
Delete "layers." and insert --layer.-- therefor Column 19, Claim 13, Line 14:
Delete "layers" and insert --layer-- therefor Signed and Sealed this
Fifteenth Day of August, 2023

Katherine Kelly Vidal
*Director of the United States Patent and Trademark Office*